US012694469B2

(12) United States Patent
Gehlaut et al.

(10) Patent No.: US 12,694,469 B2
(45) Date of Patent: Jul. 28, 2026

(54) GENERATING CUSTOMIZED ARROW HEADS UTILIZING DEEP LEARNING

(71) Applicant: Adobe Inc., San Jose, CA (US)

(72) Inventors: Tarun Gehlaut, Faridabad (IN); Stuti Jain, Ghaziabad (IN)

(73) Assignee: Adobe Inc., San Jose, CA (US)

( * ) Notice: Subject to any disclaimer, the term of this patent is extended or adjusted under 35 U.S.C. 154(b) by 313 days.

(21) Appl. No.: 18/628,250

(22) Filed: Apr. 5, 2024

(65) Prior Publication Data

US 2025/0315957 A1     Oct. 9, 2025

(51) Int. Cl.
| | |
|---|---|
| *G06T 7/13* | (2017.01) |
| *G06T 3/403* | (2024.01) |
| *G06T 5/70* | (2024.01) |
| *G06T 11/00* | (2006.01) |

(52) U.S. Cl.
CPC ............... *G06T 7/13* (2017.01); *G06T 3/403* (2013.01); *G06T 5/70* (2024.01); *G06T 11/00* (2013.01); *G06T 2207/20084* (2013.01)

(58) Field of Classification Search
CPC .. G06T 7/13; G06T 3/403; G06T 5/70; G06T 11/00; G06T 2207/20084; G06T 11/60; G06T 2207/20081; G06T 7/11; G06T 7/68
USPC ........................................................ 382/173
See application file for complete search history.

(56) References Cited

U.S. PATENT DOCUMENTS

| | | | | |
|---|---|---|---|---|
| 2008/0095419 A1* | 4/2008 | Volkau | ...................... | G06T 7/68 |
| | | | | 382/172 |
| 2013/0202174 A1* | 8/2013 | Lee | ........................ | G16H 50/30 |
| | | | | 382/131 |

| | | | | |
|---|---|---|---|---|
| 2015/0381981 A1* | 12/2015 | Gelman | ............... | H04N 19/136 |
| | | | | 382/109 |
| 2024/0144544 A1* | 5/2024 | Liew | ....................... | G06F 40/40 |
| 2024/0233285 A1* | 7/2024 | Gage | ....................... | G06T 17/20 |
| 2024/0420205 A1* | 12/2024 | Unnikrishnan | .... | G06Q 30/0625 |

(Continued)

OTHER PUBLICATIONS

Enze Xie et al. "SegFormer: Simple and Efficient Design for Semantic Segmentation with Transformers". In: CoRR abs/2105. 15203, arXiv: 2105.15203v3, Oct. 28, 2021, url: https://arxiv.org/ abs/2105v3.15203.

(Continued)

*Primary Examiner* — Ali Bayat
(74) *Attorney, Agent, or Firm* — Keller Preece PLLC

(57) ABSTRACT

The present disclosure is directed toward systems, methods, and non-transitory computer readable media that provide a digital design interface for intuitively creating custom arrows that demonstrate both visual consistency and inherent directionality within vector-based design applications. In particular, in one or more implementations, the disclosed systems receive a request to create a custom arrow from a digital object and a path segment. In addition, the disclosed systems detect that the digital object is within a threshold distance of the path segment and combine the digital object with the path segment to create a custom arrow object. In particular, the disclosed systems utilize a bilateral segmentation machine-learning model to segment the digit object and a symmetry axis detection model to determine an axis of symmetry of the digital object. Moreover, the disclosed systems attach the digital object to an endpoint of the path segment at the axis of symmetry.

20 Claims, 14 Drawing Sheets

(56) References Cited

U.S. PATENT DOCUMENTS

| | | | | |
|---|---|---|---|---|
| 2025/0078538 A1* | 3/2025 | Kohler | ................ | G06V 20/625 |
| 2025/0238902 A1* | 7/2025 | Belskikh | ................ | G06T 11/60 |

OTHER PUBLICATIONS

Gareth Loy and Jan-Olof Eklundh. "Detecting Symmetry and Symmetric Constellations of Features". In: Computer Vision—ECCV 2006. Ed. by Ales Leonardis, Horst Bischof, and Axel Pinz. Berlin, Heidelberg: Springer Berlin Heidelberg, (2006), pp. 508-521. isbn: 978-3-540-33835-2.
OpenCV Documentation. OpenCV Tutorial on Canny Edge Detection. 2018. webpage <https://docs.opencv.org/3.4/da/d22/tutorial_py_canny.html webpage>. 3 pages. May 6, 2024. Retrieved on May 7, 2024.
Zhou Wang et al. "Image quality assessment: from error visibility to structural similarity". In: IEEE Transactions on Image Processing 13.4 (2004), pp. 600-612. doi: 10.1109/TIP.2003.819861.

* cited by examiner

1100

Receiving A Request To Create A Custom Arrow *1102*

Detecting A Digital Object Is Within A Threshold Distance Of A Path Segment *1104*

Generating A Custom Arrow *1106*

Segmenting The Digital Object *1106a*

Determining An Axis Of Symmetry Based On The Segmentation *1106b*

Attaching The Digital Object To The Path Segment At The Axis Of Symmetry *1106c*

GENERATING CUSTOMIZED ARROW HEADS UTILIZING DEEP LEARNING

BACKGROUND

Advancements in computing devices and computer design applications has led to innovative developments in computer image design and editing software. For example, certain computer design applications allow for editing and manipulating of digital images that incorporate various vector paths, such as Bézier curves, to generate a diverse range of graphical objects. Unfortunately, simple Bézier curves lack the capability to indicate directionality/orientation and transition/symmetry points. As a result, the state of the art has a number of shortcomings with regard to flexibility and operational efficiency when creating, editing, and generating design elements that portray an inherent sense of directionality within digital images, such as arrow heads.

SUMMARY

One or more embodiments provide benefits and/or solve one or more of the foregoing or other problems in the art with systems, methods, and non-transitory computer readable storage media that provide an intuitive user interface tailored to streamline creating and modifying custom arrows in vector-based design applications utilizing deep learning. In particular, the disclosed systems utilize deep learning to automatically detect directionality and lines of symmetry of custom digital artwork. Utilizing the deep learning detected directionality and symmetry, one or more embodiments rotate, size, and attach the custom digital artwork onto vector paths to form custom arrows. For example, utilizing deep learning, one or more embodiments allow a user to simply select a digital object (e.g., intended custom arrowhead) from a design workspace and initiate an automated arrow generation workflow. After detecting the initiation of the automated arrow generation workflow that associates the digital object with a path segment, the disclosed systems transform the digital object into a custom arrowhead and the path segment into a shaft of the custom arrow.

In particular, the disclosed systems require minimal user input to automate the creation of custom arrows by combining custom digital artwork and vector paths utilizing novel deep learning. For example, the disclosed systems include a transformer-based neural network that segments objects into halves to determine an axis of symmetry which is used as an attachment point for the path segment. Moreover, the disclosed systems utilize a symmetry metric to automatically determine an optimal orientation and rotate the digital object to align with the direction of the path segment, providing the visual impression that the custom arrowhead points along the direction of the arrow shaft. In addition, the disclosed systems resize the custom arrowhead to coordinate with the width of the path segment to provide the visual impression where the custom arrowhead appears to be a natural extension of the arrow shaft. In this way, the disclosed systems automate the creation of a custom arrow with minimal user input.

BRIEF DESCRIPTION OF THE DRAWINGS

This disclosure will describe one or more example implementations of the systems and methods with additional specificity and detail by referencing the accompanying figures. The following paragraphs briefly describe those figures, in which.

DETAILED DESCRIPTION

Figure 1:
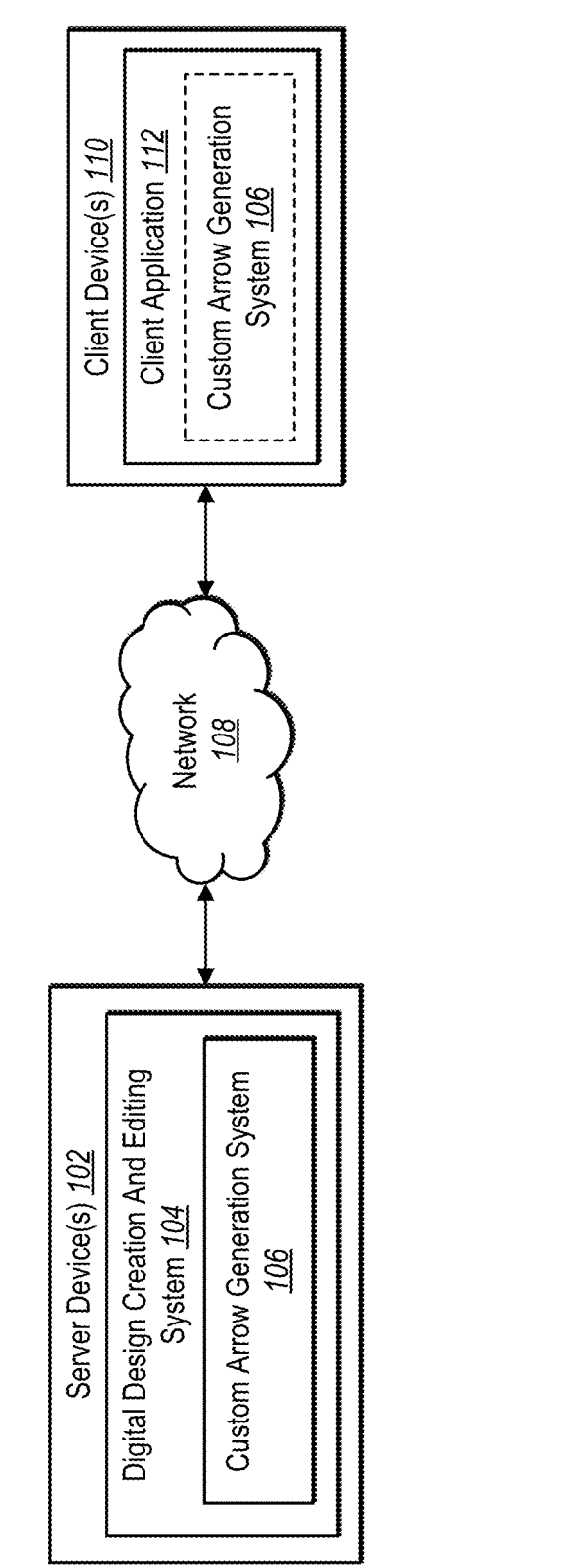
FIG. 1 illustrates a schematic diagram of an example environment of a custom arrow generation system in accordance with one or more embodiments.

This disclosure describes one or more embodiments of a custom arrow generation system that provides a deep learning powered digital design interface for intuitively creating custom arrows that demonstrate both visual consistency and inherent directionality. In particular, in one or more implementations, the custom arrow generation system creates custom arrows from a digital object utilizing deep learning. For example, the custom arrow generation system utilizes determines directionality and a line of symmetry of the digital object utilizing deep learning. The custom arrow generation system utilizes the determined directionality and line of symmetry to attach the digital object to a path segment to create a custom arrow. Indeed, utilizing deep learning, the custom arrow generation system combines a digital object with a path segment such that the digital object is oriented to indicate a sense of progression.

More specifically, in one or more implementations, the custom arrow generation system determines an axis of symmetry for the digital object utilizing a neural network. The custom arrow generation system determines an orientation of the digital object utilizing a structural orientation model. The custom arrow generation system rotates the digital object to align the axis of symmetry with the end of a path segment based on the determined orientation. For example, the custom arrow generation system orients the digital object (and the axis of symmetry) to align with the tangent of the endpoint of the path segment such that the digital object gives the visual impression of pointing in the direction of the endpoint of the path segment. Further, in certain implementations, the custom arrow generation system resizes the digital object to aesthetically match the dimensions of the path segment.

As mentioned, in one or more embodiments, the custom arrow generation system determines an axis of symmetry for a digital object utilizing deep learning. To illustrate, in one or more embodiments, the custom arrow generation system determines an axis of symmetry for a digital object utilizing a bilateral segmentation machine-learning model to divide the digital object into two parts that are mirror images of each other (or approximate mirror images). For example, the custom arrow generation system determines an axis of symmetry that runs from a point side of the digital object down to the base side of the digital object, bisecting the arrowhead object into two symmetrical half segments (e.g., a right-hand side and a left-hand side). Furthermore, the custom arrow generation system utilizes a symmetry axis detection model, post-processing techniques, and linear regression to generate a line to fix the pixels along the axis of symmetry.

Furthermore, in one or more embodiments, the custom arrow generation system automatically rotates the digital object to match the vector path based on the axis of symmetry. In particular, in certain embodiments, the custom arrow generation system determines the appropriate orientation for the digital object based aligning the axis of symmetry with a tangent of an endpoint of the path segment. Indeed, in one or more embodiments, the custom arrow generation system adjusts the orientation of the digital object to be visually suitable as an arrowhead. To illustrate, the custom arrow generation system utilizes a structural orientation model to determine an orientation for the digital object based on determining a structural similarity index between the digital object and a tapered object oriented in a first direction or a tapered object oriented in a second direction. In certain embodiments, based on the structural similarity index, the custom arrow generation system rotates the custom arrowhead an additional 180-degrees to obtain the appropriate directionality.

In addition, in one or more embodiments, the custom arrow generation system scales the digital object. For example, the custom arrow generation system determines a scale factor for the digital object based on a combination of the width of the digital object, the height of the digital object, and/or the dimensions of the path segment. In this way, the custom arrow generation system automatically creates a custom arrow that is appropriately sized relative to the path segment.

Thus, the custom arrow generation system overcomes shortcomings of conventional systems utilizing deep learning. Specifically, conventional systems have a number of technical shortcomings with regard flexibility and computational efficiency when creating custom arrows. In particular, existing design systems lack flexibility. For example, many existing design systems inflexibly render arrows utilizing a set number of pre-defined arrowheads that limit the ability of users to create customized arrows. To illustrate, many existing design systems provide only pre-defined arrowheads that do not integrate seamlessly with other design elements nor convey a customized style—such as a whimsical design for a casual event or a sharp, sleek arrowhead for a more formal presentation. As a result, many existing systems inflexibly require users to repeatedly adjust the same pre-defined arrowheads to suit new design contexts.

Although some design systems provide the ability to customize arrowheads by using workarounds, these workarounds are often difficult to implement. For example, the workflow of conventional design systems for creating digital content to function as a custom arrow is complex and unintuitive, which effectively diminishes the flexibility of the conventional design systems. To illustrate, creating custom arrows in many existing design systems requires navigating a series of complex menus and understanding how to implement multiple vector manipulation techniques to create a custom arrow. Furthermore, after creating a custom arrow, existing design systems often require the user to access separate editing modules and reload the design application to enable the custom arrow within the design application, further fragmenting the design process. Indeed, the workflow of existing design systems is cumbersome, which significantly hinders the flexibility and/or adaptability of existing design systems when creating custom arrows.

Relatedly, many conventional design systems are operationally inefficient. For example, the operational efficiency of many conventional systems is hampered by their reliance on extensive libraries of pre-defined arrowheads. Navigating these vast collections can be cumbersome and time-consuming, as client devices are required to comb through numerous options to select an appropriate arrowhead. Consequently, this can result in longer design periods and reduced operational efficiency, especially when dealing with a significant volume of graphic elements. Furthermore, to add a custom shape/design, conventional systems often require adding the custom shape/design to a system directory and restarting the design software so the custom shape/design appears as an option. Thus, conventional systems require navigating through several user interface panels and file system directories all after a manually intensive process of creating the custom arrow.

As suggested above, embodiments of the custom arrow generation system provide a variety of advantages over conventional design systems. For example, one or more embodiments of the custom arrow generation system improve operational flexibility in comparison to conventional design systems. For example, in contrast to conventional systems which provide only pe-defined arrowhead libraries, embodiments of the custom arrow generation system provide the ability to generate custom arrows based on a generated or selected digital object. Indeed, unlike many conventional design systems, the custom arrow generation system does not restrict the creation of arrows to pre-defined artwork or require the use of standardized arrowhead art.

In addition, in one or more embodiments, unlike the cumbersome workarounds provided by some conventional systems, the custom arrow generation system provides a streamlined process that enhances operational efficiency. For example, unlike these conventional systems, the custom arrow generation system does not require complex menus or require the use of intricate vector manipulation techniques to achieve a custom arrow design. Instead, the custom arrow generation system provides an intuitive interface for client device applications to easily customize arrowheads with just a few clicks (or a single click) and without requiring complex menu interaction, navigating file system directories, or rebooting of software. Furthermore, the custom arrow generation system eliminates the need for accessing separate editing modules and reloading the design application to enable the custom arrow, thereby streamlining the design process and enhancing operational efficiency.

Additional detail regarding the custom arrow generation system will now be provided with reference to the figures. For example, FIG. 1 illustrates a schematic diagram of an exemplary system environment ("environment") 100 in which a custom arrow generation system 106 operates. As illustrated in FIG. 1, the environment 100 includes server device(s) 102, a network 108, and client device(s) 110.

Although the environment 100 of FIG. 1 is depicted as having a particular number of components, the environment 100 is capable of having any number of additional or alternative components (e.g., any number of servers, client devices, or other components in communication with the custom arrow generation system 106 via the network 108). Similarly, although FIG. 1 illustrates a particular arrangement of the server device(s) 102, the network 108, and client device(s) 110, various additional arrangements are possible.

The server device(s) 102, the network 108, and client device(s) 110 are communicatively coupled with each other either directly or indirectly (e.g., through the network 108 discussed in greater detail below in relation to FIG. 12). Moreover, the server device(s) 102 and client device(s) 110 include one of a variety of computing devices (including one or more computing devices as discussed in greater detail with relation to FIG. 12).

As illustrated in FIG. 1, the environment 100 includes the server device(s) 102 and digital design creation and editing system 104. The server device(s) 102 utilizes the digital design creation and editing system 104 to generate, track, store, process, receive, and transmit electronic data, including custom arrows, digital objects, and path segments. For example, the server device(s) 102 receives or monitors interactions across the client device(s) 110. In some implementations, the server device(s) 102 transmits content to the client device(s) 110 to cause the client device(s) 110 to display content associated with custom arrows. For example, the server device(s) 102 presents a digital object, path segment, and/or custom arrow to client device(s) 110 and displays a digital object, path segment, and/or custom arrow on the client device(s) 110 with the digital object, path segment, and/or custom arrow displayed corresponding to system need (e.g., provide a custom arrow for display via client application(s) 112).

Additionally, the server device(s) 102 includes all, or a portion of, the custom arrow generation system 106. For example, the custom arrow generation system 106 operates on the server device(s) 102 to access digital content (including digital objects, path segments, and/or custom arrows), determine digital content changes, and provide localization of content changes to the client device(s) 110. In one or more embodiments, via the server device(s) 102, the custom arrow generation system 106 generates and displays digital objects, path segments, and/or custom arrows based on the client device(s) 110 input. Example components of the custom arrow generation system 106 will be described below with regard to FIG. 10.

Furthermore, as shown in FIG. 1, the illustrated system includes the client device(s) 110. In some embodiments, the client device(s) 110 include, but are not limited to, mobile devices (e.g., smartphones, tablets), laptop computers, desktop computers, or another type of computing devices, including those explained below in reference to FIG. 12. Some embodiments of client device(s) 110 are operated by a user to perform a variety of functions via respective client application(s) 112 such as the generation and modification of custom arrows. The client device(s) 110 include one or more applications (e.g., the client application(s) 112) that access, edit, modify, store, and/or provide, for display, digital image content. For example, in some embodiments, the client application(s) 112 include a software application installed on the client device(s) 110. In other cases, however, the client application(s) 112 include a web browser or other application that accesses a software application hosted on the server device(s) 102.

The custom arrow generation system 106 can be implemented in whole, or in part, by the individual elements of the environment 100. Indeed, as shown in FIG. 1 the custom arrow generation system 106 can be implemented with regard to the server device(s) 102 and the client device(s) 110. In particular embodiments, the custom arrow generation system 106 on the client device(s) 110 comprises a web application, a native application installed on the client device(s) 110 (e.g., a mobile application, a desktop application, a plug-in application, etc.), or a cloud-based application where part of the functionality is performed by the server device(s) 102.

In additional or alternative embodiments, the custom arrow generation system 106 on the client device(s) 110 represents and/or provides the same or similar functionality as described herein in connection with the custom arrow generation system 106 on the server device(s) 102. In some implementations, the custom arrow generation system 106 on the server device(s) 102 supports the custom arrow generation system 106 on the client device(s) 110.

In some embodiments, the custom arrow generation system 106 includes a web hosting application that allows the client device(s) 110 to interact with content and services hosted on the server device(s) 102. To illustrate, in one or more implementations, the client device(s) 110 accesses a web page or computing application supported by the server device(s) 102. The client device(s) 110 provides input to the server device(s) 102 (e.g., selected content items). In response, the custom arrow generation system 106 on the server device(s) 102 generates/modifies digital content. The server device(s) 102 then provides the digital content to the client device(s) 110.

In another implementation, the custom arrow generation system 106 on the server device(s) 102 supports the custom arrow generation system 106 on the client device 110. For instance, in some cases, the custom arrow generation system 106 on the server device(s) 102 generates or learns parameters for one or more machine learning models (e.g., a bilateral segmentation machine-learning model). The custom arrow generation system 106 then, via the server device(s) 102, provides the one or more trained machine learning models to the client device 110. In other words, the client device 110 obtains (e.g., downloads) the one or more machine learning models (e.g., with any learned parameters) from the server device(s) 102. Once downloaded, the one or more machine learning models on the client device 110 utilizes the one or more trained machine learning models to generate custom arrows independent from the server device(s) 102.

In some embodiments, though not illustrated in FIG. 1, the environment 100 has a different arrangement of components and/or has a different number or set of components altogether. For example, in certain embodiments, the client device(s) 110 communicate directly with the server device(s) 102, bypassing the network 108. As another example, the environment 100 includes a third-party server comprising a content server and/or a data collection server.

Figure 2:
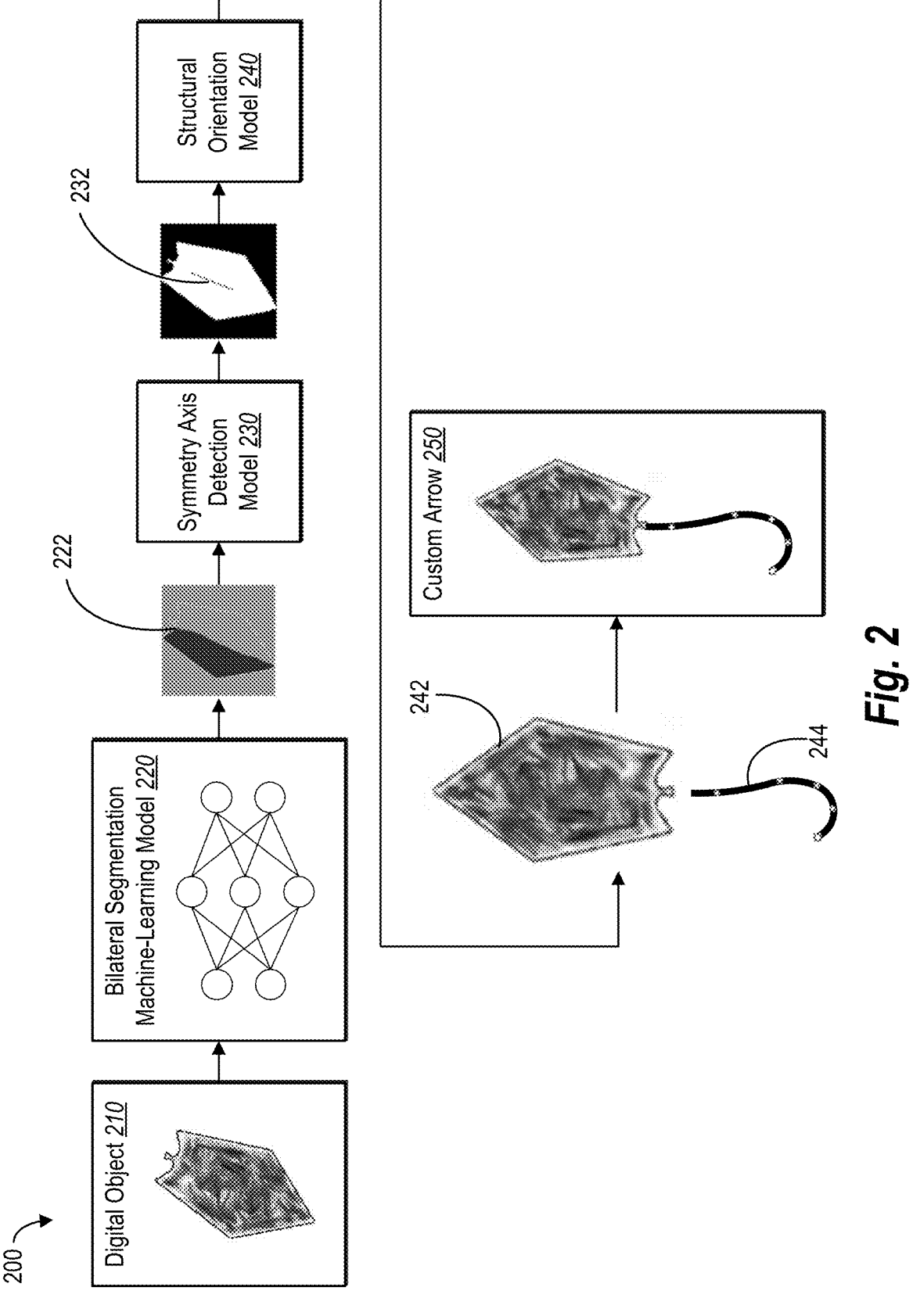
FIG. 2 illustrates an example overview of generating a custom arrow utilizing a digital object in accordance with one or more embodiments.

As previously mentioned, in one or more embodiments, the custom arrow generation system 106 generates digital design content including custom arrows utilizing an intuitive and efficient interface and deep learning. For instance, FIG. 2 illustrates an overview diagram of the custom arrow generation system 106 generating a custom arrow utilizing a digital object in accordance with one or more embodiments. Additional detail regarding the various acts of FIG. 2 is provided thereafter with reference to subsequent figures.

As shown in FIG. 2, the custom arrow generation system 106 generates a custom arrow by combining a digital object with a path segment utilizing the disclosed methods. In particular, in one or more embodiments, the custom arrow generation system 106 receives or determines a digital object 210 (e.g., through a client device interaction). In one or more embodiments, the digital object 210 is generated by a diffusion neural network (or other method) such as through a text-to-image diffusion neural network. For example, the digital object 210 includes a uniquely designed object and/or a non-conventional shape. To illustrate the digital object 210 includes a vector-based object that is shaped to align with the aesthetic or functional requirements of a design project, adopting various forms and embellishments like curves, indents, or decorative details. In certain embodiments, digital object 210 is a symmetrical vector object that reflects directionality by incorporating a point side (e.g., the top end that would typically lead in the direction of the arrow flight) and a base side (the bottom end that would attach to an arrow shaft).

As further shown, the custom arrow generation system 106 utilizes a bilateral segmentation machine-learning model 220 to partition the digital object 210. As shown, the bilateral segmentation machine-learning model 220 generates a segmented digital object 222 that includes a trinary structure with two symmetrical segment halves (or nearly symmetrical halves) and a background segment. As shown, the bilateral segmentation machine-learning model 220 determines a first half segment and a second half segment that divide the digital object 210 into two parts that closely mirror each other in terms of shape, size, and orientation. Additionally, the bilateral segmentation machine-learning model 220 identifies and separates the background segment, which encompasses the area surrounding the first half segment and the second half segment. The bilateral segmentation machine-learning model 220 utilizes the background segment as a reference or backdrop for analyzing the digital object 210.

As further shown, the custom arrow generation system 106 utilizes a symmetry axis detection model 230 to determine an axis of symmetry 232 of the digital object 210. In one or more embodiments, the symmetry axis detection model 230 determines an axis of symmetry 232 that divides the digital object by bisecting the digital object into two separate parts (e.g., the first half segment and the second half segment). For example, the symmetry axis detection model 230 determines an axis of symmetry 232 that extends from the midpoint of the point side of the digital object to the midpoint of the base side of the digital object to divide the digital object into two balanced (or nearly balanced) halves corresponding to the first half segment and the second half segment of the segmented digital object 222. To illustrate, the symmetry axis detection model 230 determines an axis of symmetry 232 that runs longitudinally from the point side to the base side such that the digital object is divided into a right-hand side and a left-hand side.

As further shown, the custom arrow generation system 106 utilizes a structural orientation model 240 to orient the digital object 210 to generate the oriented digital object 242. In particular, the structural orientation model 240 rotates the digital object 210 to align with the path segment 244. For example, the custom arrow generation system 106 system determines the tangent at the endpoint of the path segment 244. Further, the structural orientation model 240 rotates the digital object 210 to align the axis of symmetry 232 with the tangent at the endpoint of the path segment 244. As shown, the structural orientation model 240 rotates the digital object 210 between 0 and 360 degrees to align the axis of symmetry 232 with the tangent of the endpoint of the path segment 244.

In addition, the custom arrow generation system 106 creates the custom arrow 250. In particular, the custom arrow generation system 106 attaches the oriented digital object 242 to the path segment 244. In particular, the custom arrow generation system 106 attaches the oriented digital object 242 to the path segment 244 based on the axis of symmetry 232. In one or more embodiments, the path segment 244 includes a Bézier curve defined by a set of control points, including an endpoint at the terminal end of the path segment. The custom arrow generation system 106 attaches the digital object 210 at the midpoint of the base side of the digital object 210 (e.g., at the axis of symmetry) to the endpoint of the path segment 244. As shown, if necessary and as part of generating the custom arrow 250, the custom arrow generation system 106 resizes the oriented digital object 242 to correspond with the dimensions of the path segment 244. For example, the custom arrow generation system 106 resizes the oriented digital object 242 to a visually appropriate size (to aesthetically match the path segment 244) based on a comparison of the width (e.g., stroke size) of the digital object 210 and the width (e.g., width of the base side) of the path segment 244.

As mentioned, in one or more embodiments, the custom arrow generation system 106 generates the custom arrow via efficient, intuitive interactions on a client device (e.g., by providing a single-click solution). To illustrate, in one or more embodiments, the user of the client device simply selects the digital object 210 from the canvas, drags the digital object 210 to a position within a threshold distance of the endpoint of the path segment 244, and clicks to initiate the creation of the custom arrow. In certain embodiments, the user of the client device simply selects the digital object 210 and the path segment 244 and activates the custom arrow generation system 106 to initiate the creation of the custom arrow (without needing to position the digital object 210). In this way, the client device triggers the custom arrow generation system 106 to create the custom arrow 250 and attach the digital object 210 (as oriented digital object 242) to the path segment 244 without further user input. As mentioned, the custom arrow generation system 106 automatically determines the correct orientation and size to use to attach the digital object 210 to the path segment 244 without additional client device interaction. Indeed, based on a simple client device action, the custom arrow generation system 106 creates the custom arrow 250.

Figure 3:
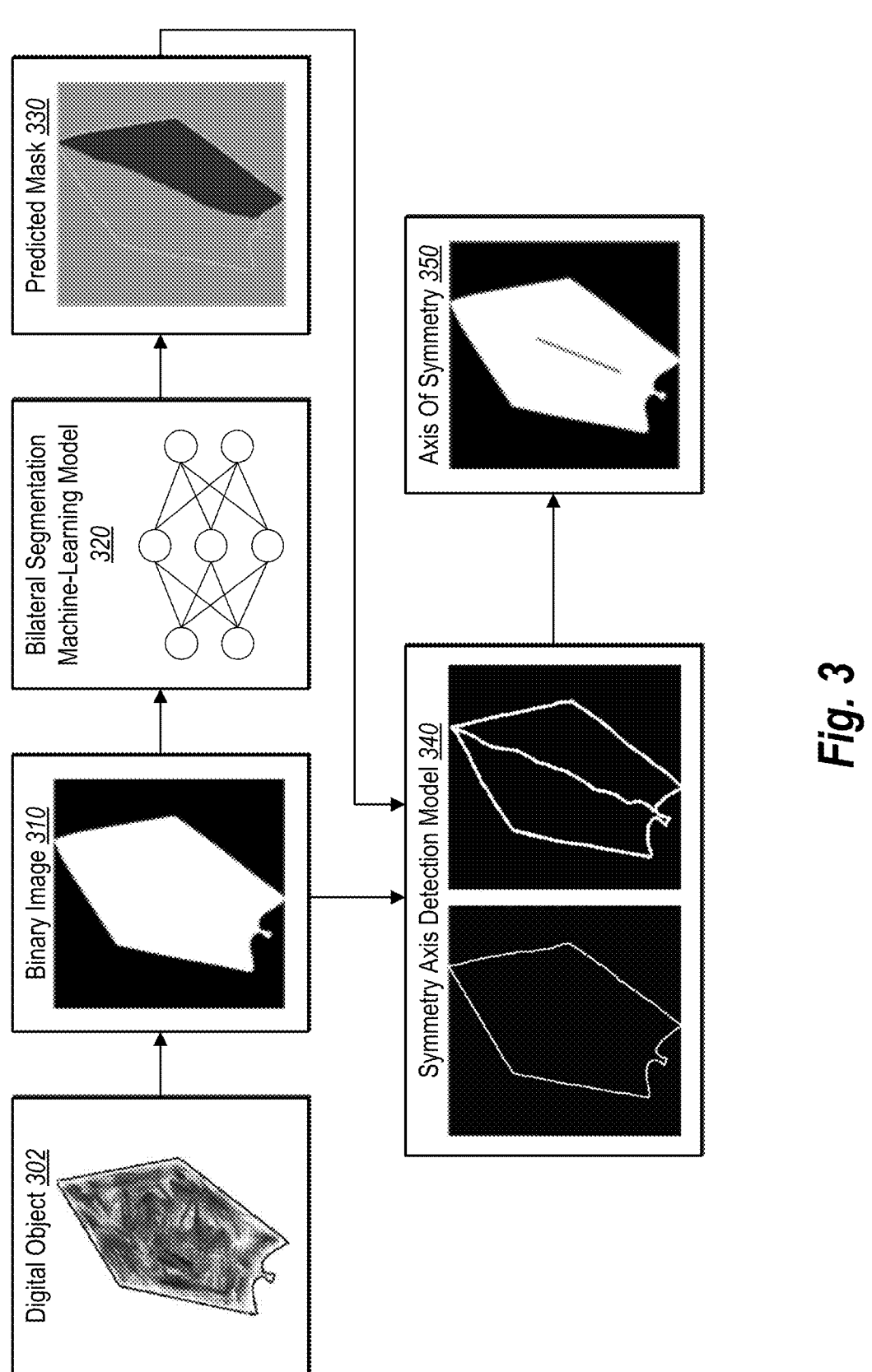
FIG. 3 illustrates an example of determining an axis of symmetry in accordance with one or more embodiments.

As mentioned, the custom arrow generation system 106 determines an axis of symmetry for the digital object. FIG. 3 illustrates an example of determining an axis of symmetry in accordance with one or more embodiments. As shown in FIG. 3, the custom arrow generation system 106 generates a binary image 310 based on the digital object 302. In particular, the custom arrow generation system 106 creates a binary image 310 representing either the presence or absence of a part of the digital object 302. In one or more embodiments, the custom arrow generation system 106 utilizes a binary-raster where each pixel location is addressed by its row (i) and column (j) indices. For example, the binary-raster M is defined as follows:

$$M[i, j] = \begin{cases} 0, \text{ if the pixel lies outside of the digital object boundary} \\ 1, \text{ if the pixel lies on or inside the digital object boundary} \end{cases}$$

A pixel value of 0 indicates that the pixel is outside the boundary of the digital object 302. As shown, in the visualization of M (e.g., the binary image 310), these pixels appear as the background and are colored black when the binary image 310 is rendered visually. A pixel value of 1 indicates that the pixel is on or inside the boundary of the digital object 302. As shown, visually these pixels make up the shape of the digital object 302 and are colored white in the binary image 310 when rendered visually. As shown in FIG. 3, the custom arrow generation system 106 provides the binary image 310 to a bilateral segmentation machine-learning model 320. By providing the binary image 310 to the bilateral segmentation machine-learning model 320, the custom arrow generation system 106 provides a representation of the structure of the digital object 302 to the bilateral segmentation machine-learning model 320.

As further shown, the custom arrow generation system 106 utilizes the bilateral segmentation machine-learning model 320 to determine a predicted mask 330. In one or more implementations, the bilateral segmentation machine-learning model 320 is a machine learning model (e.g., a neural network) or a collection of machine learning models designed for semantic segmentation tasks (e.g., partitioning an image into multiple segments).

Relatedly, in certain embodiments, a machine learning model includes or refers to a computer algorithm or a collection of computer algorithms that automatically improve for a particular task through iterative outputs or predictions based on the use of data. For example, a machine learning model utilizes one or more learning techniques to improve accuracy and/or effectiveness. Example machine learning models include various types of neural networks, decision trees, support vector machines, linear regression models, and Bayesian networks. In some embodiments, the custom arrow generation system 106 utilizes a large language machine-learning model in the form of a diffusion neural network.

Along these lines, a neural network includes or refers to a machine learning model that is trained and/or tuned based on inputs to determine digital content items, key elements, or approximate unknown functions. For example, a neural network includes a model of interconnected artificial neurons (e.g., organized in layers) that communicate and learn to approximate complex functions and generate outputs (e.g., image segments) based on a plurality of inputs provided to the neural network. In some cases, a neural network refers to an algorithm (or set of algorithms) that implements deep learning techniques to model high-level abstractions in data. In certain embodiments, a neural network includes various layers, such as an input layer, one or more hidden layers, and an output layer that each perform tasks for processing data. For example, a neural network includes a deep neural network, a convolutional neural network, a transformer neural network, a diffusion neural network, a recurrent neural network (e.g., an LSTM), a graph neural network, or a generative adversarial neural network.

In some cases, the custom arrow generation system 106 utilizes a transformer-based neural network architecture. In particular, the custom arrow generation system 106 leverages a self-attention mechanism to segment objects within an image. For example, the custom arrow generation system 106 integrates transformer models with a streamlined multilayer perceptron (MLP) decoder to efficiently handle segmentation tasks and to capture both the fine details and the broader contextual information necessary for accurate image segmentation. For example, the bilateral segmentation machine-learning model 320 utilizes a transformer-based neural network to classify the pixels in the binary image 310 as background pixels, first half pixels, or second half pixels to generate the predicted mask 330. In this way, the custom arrow generation system 106 employs hierarchical features of a neural network organized in a pyramid configuration with a positional encoding scheme tailored to the requirements of the segmentation task and generate the predicted mask 330.

For example, as further shown in FIG. 3, the custom arrow generation system 106 utilizes the bilateral segmentation machine-learning model 320 to generate the predicted mask 330. In one or more embodiments, the custom arrow generation system 106 generates the predicted mask 330 which includes a ternary image segmenting the image pixels where each pixel location is addressed by its row (i) and column (j) indices into one of three categories as follows:

$$O[i, j] =$$
$$\begin{cases} 0, \text{ if the pixel corresponds to the background} \\ 1, \text{ if the pixel lies on the left hand side of the axis of symmetry} \\ 2, \text{ if the pixel lies on the right hand side of the axis of symmetry} \end{cases}$$

As shown, the custom arrow generation system 106 utilizes ternary segmentation to separate the background from the digital object 302 while also distinguishing between the two symmetrical halves of the digital object 302 (e.g., a first half segment and a second half segment). In particular, the bilateral segmentation machine-learning model 320 classifies the pixels in the binary image 310 as background pixels, first half pixels, or second half pixels to generate the predicted mask 330. In this way, the custom arrow generation system 106 differentiates between two sides of the digital object 302.

In addition, the custom arrow generation system 106 fixes a line (or a path) to the pixels along the common boundary of the left-hand side and the right-hand side pixels to determine the axis of symmetry 350 for the digital object 302. For example, the custom arrow generation system 106 provides the predicted mask 330 and the binary image 310 to the symmetry axis detection model 340 to determine an axis of symmetry 350 based on the intersection of the first half segment (e.g., left-hand side) and the second half segment (e.g., right-hand side) of the digital object 302. In particular, the custom arrow generation system 106 determines edges for the predicted mask 330 and the binary image 310 and compares these edges to determine the intersection of the first half segment and the second half segment to determine the axis of symmetry 350 as described in more detail in relation to FIG. 5.

Figure 4A:
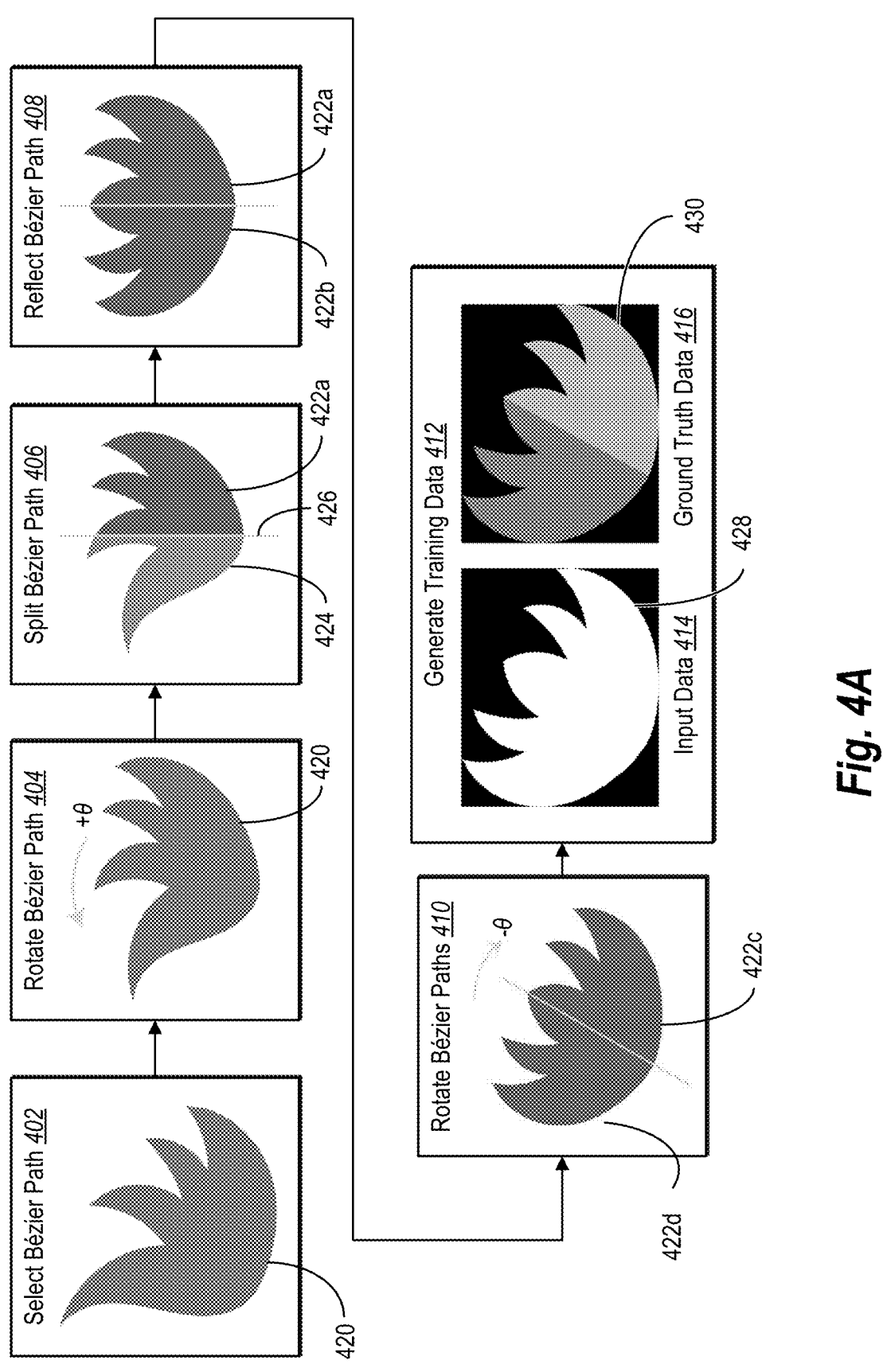
FIG. 4A illustrates an example of generating training data for a bilateral segmentation machine-learning model in accordance with one or more embodiments.
Figure 4B:
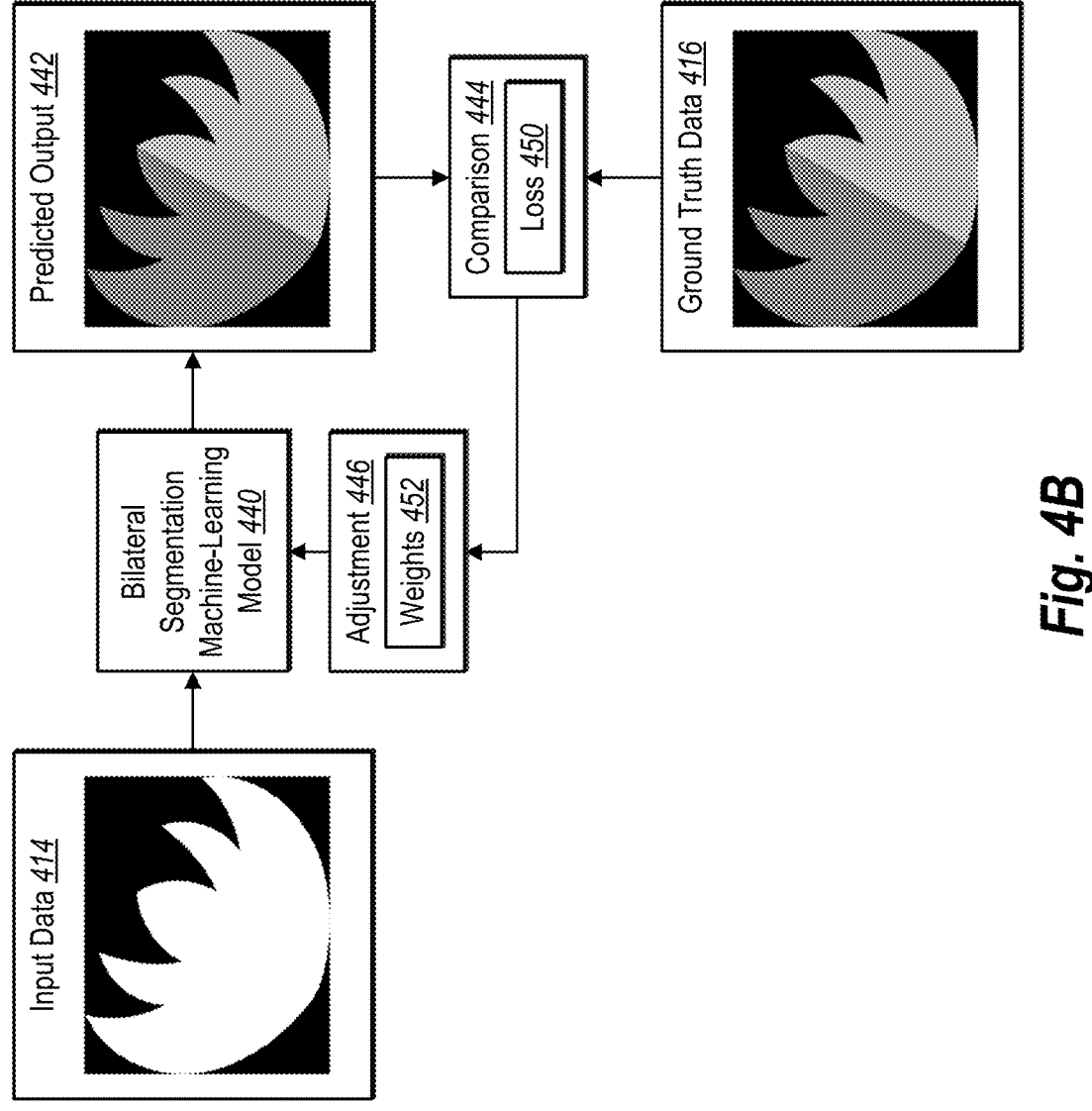
FIG. 4B illustrates an example of training a bilateral segmentation machine-learning model in accordance with one or more embodiments.

As mentioned, the custom arrow generation system 106 trains and utilizes a bilateral segmentation machine-learning model to segment the digital object when generating custom arrows. FIG. 4A illustrates an example of generating synthetic training data for a bilateral segmentation machine-learning model in accordance with one or more embodiments. FIG. 4B illustrates an example of training a bilateral segmentation machine-learning model in accordance with one or more embodiments.

As shown in FIG. 4A, the custom arrow generation system 106 generates a synthetic dataset of symmetrical shapes rotated to different angles for training the bilateral segmentation model. In particular, the custom arrow generation system 106 performs an act 402 to select a Bézier path from a vector-based graphic. In one or more implementations, the custom arrow generation system 106 selects a vector-based graphic icon from a dataset of vector-based graphic icons. For example, the dataset includes vector-based graphic icons that feature a wide array of designs and includes vector-based graphic icons with differing levels of complexity and with a multitude of shapes and orientations. Further, the custom arrow generation system 106 extracts a Bézier path 420 (e.g., the largest and/or most prominent Bézier path) from the vector-based graphic icon to generate a vector graphic.

As further shown, the custom arrow generation system 106 performs act 404 to rotate the Bézier path 420 by a random angle θ. By rotating the Bézier path 420, the custom arrow generation system 106 introduces variability into the training dataset to train the bilateral segmentation machine-learning model to generalize better when making predictions. For example, by training on data that includes various orientations, the trained bilateral segmentation machine-learning model is less likely to overfit to the position of objects in the training examples and more robustly segments custom arrowhead shapes regardless of their rotation as input data.

In addition, in one or more implementations, the custom arrow generation system 106 performs act 406 to split the Bézier path 420 using a vertical line. For example, as shown, the custom arrow generation system 106 splits the Bézier path 420 using a vertical line 426 passing through the center of the Bézier path 420. Further, the custom arrow generation system 106 generates two Bézier paths (e.g., Bézier path 422a and Bézier path 424) from the original Bézier path 420 of the vector graphic based on the act 406.

As further shown, the custom arrow generation system 106 performs act 408 to reflect one of the two Bézier paths (e.g., Bézier path 422a) and create a new symmetric vector graphic. In particular, the custom arrow generation system 106 randomly discards one of the two Bézier paths generated in act 406 (e.g., Bézier path 422a). Further, the custom arrow generation system 106 duplicates and reflects the remaining Bézier path (e.g., Bézier path 422a) around the vertical line 426 in the act 406. As shown, by performing the act 408, the custom arrow generation system 106 creates a new random, symmetrical vector graphic which incorporates the original Bézier path 422a and the reflected Bézier path 422b.

In addition, the custom arrow generation system 106 performs act 410 to rotate the Bézier path 422a and Bézier path 422b. In particular, the custom arrow generation system 106 rotates the Bézier path 422a as shown by Bézier path 422c and rotates the Bézier path 422b as shown by Bézier path 422d. In one or more embodiments, the custom arrow generation system 106 rotates the Bézier paths by the negative of the random angle θ from act 404. In this way, the custom arrow generation system 106 ensures that the axis of symmetry for the training data example does not always have a vertical orientation. In other embodiments, the custom arrow generation system 106 performs the act 410 by rotating the Bézier paths by another angle (e.g., a specified angle, a random angle).

Furthermore, the custom arrow generation system 106 performs an act 412 to generate the training data. To generate the input data 414, the custom arrow generation system 106 joins (e.g., combines) the Bézier path 422c and Bézier path 422d to create Bézier path 428. The custom arrow generation system 106 generates a binary raster for the input data 414 by giving the Bézier path 428 a white fill and rasterizing the Bézier path 428 (and interior) on a black background. As also shown, to generate the ground truth data 416 (that corresponds to the input data 414), the custom arrow generation system 106 creates a ternary mask based on the Bézier path 422c and the Bézier path 422d. As shown, the custom arrow generation system 106 assigns the Bézier path 422c (and interior) a gray color of 2 (e.g., $2/255$) and the Bézier path 422d (and interior) a gray color of 1 (e.g., $1/255$). Further, the custom arrow generation system 106 rasterizes the vector graphic 430 (generated from the Bézier path 422c and the Bézier path 422d) on a black background with a background value of 0 (e.g., $0/255$). In this way, the custom arrow generation system 106 generates ground truth data 416 that consists of a ternary image that has been segmented into symmetrical, or nearly symmetrical, segments with clear distinctions between the left-hand side pixels (e.g., first half pixels), right-hand side pixels (e.g., second half pixels), and the background pixels.

In one or more embodiments, and to provide a diverse training dataset, the custom arrow generation system 106 repeats the acts 404-416 for different angle values. In addition, to further enhance the dataset and prevent the bilateral segmentation machine-learning model from learning to only recognize perfectly symmetrical shapes, which are an unrealistic representation of real-world data, the custom arrow generation system 106 introduces slight modifications or mutations to the Bézier path 422a and Bézier path 422b before they are combined/joined in the act 410. These mutations ensure that the bilateral segmentation machine-learning model is exposed to and learns from minor asymmetries, thus preparing the bilateral segmentation machine-learning model to handle a range of digital object shapes and styles that a bilateral segmentation machine-learning model 440 might encounter in actual application scenarios. In this way, the custom arrow generation system 106 generates a diverse synthetic dataset of symmetrical, or nearly symmetrical, shapes rotated to different angels for training the bilateral segmentation model.

As shown in FIG. 4B, the custom arrow generation system 106 trains the bilateral segmentation machine-learning model 440 utilizing the custom training data including input data 414 and ground truth data 416. As shown, based on the input data 414, the bilateral segmentation machine-learning model 440 determines a predicted output 442. For example, the bilateral segmentation machine-learning model 440 generates the predicted output 442 as a ternary image segmented into symmetrical (or nearly symmetrical) sections of left-hand side pixels, right-hand side pixels, and background pixels. In one or more implementations, the bilateral segmentation machine-learning model 440 combines a transformer-based encoder with a MLP decoder and the input data 414 is processed through the transformer layers and then through the MLP decoder to generate predictions for each pixel of the predicted output 442. In this way the bilateral segmentation machine-learning model 440 takes into account both the pixel values and the spatial relationships between pixels to improve the segmentation accuracy.

Furthermore, the custom arrow generation system 106 performs a comparison 444 between the ground truth data

416 and the predicted output 442. In particular, the custom arrow generation system 106 performs the comparison 444 to evaluate how closely the predicted output 442 matches the ground truth data 416. The gradients of a loss 450 are computed with respect to the weights 452 of the bilateral segmentation machine-learning model 440.

As further shown, the custom arrow generation system 106 adjusts the weights 452 to minimize the loss 450. In particular, the custom arrow generation system 106 performs an adjustment 446 based on the loss 450 of (or error in) the predicted output 442. For example, the custom arrow generation system 106 iteratively performs this training through back-propagation and/or gradient optimization to modify the weights 452 toward a more optimal solution for the predicted output 442. In some implementations, the custom arrow generation system 106 determines a learning rate (e.g., a scalar parameter) to adjust the step size of weights 452 and perform threshold changes during back-propagation. By adjusting the learning rate, the custom arrow generation system 106 controls how quickly or slowly the bilateral segmentation machine-learning model 440 converges to a desired solution. By repeatedly adjusting the weights 452 for the bilateral segmentation machine-learning model 440, the custom arrow generation system 106 minimizes prediction errors and enhances the accuracy of the bilateral segmentation machine-learning model 440 in segmenting new, unseen digital objects.

To illustrate, the custom arrow generation system 106 accepts an input digital object of the input data 414. Further, the custom arrow generation system 106 utilizes the bilateral segmentation machine-learning model 440 to generate the predicted output 442 during a feed-forward process. In addition, the custom arrow generation system 106 compares the ground truth data 416 to the predicted output 442 utilizing the comparison 444 to determine a loss 450 for back-propagation. Based on the loss 450, the custom arrow generation system 106 adjusts the weights 452 and parameters of the bilateral segmentation machine-learning model 440. In this way, the custom arrow generation system 106 trains the bilateral segmentation machine-learning model 440 to segment the digital objects for use in determining the axis of symmetry.

Figure 5:
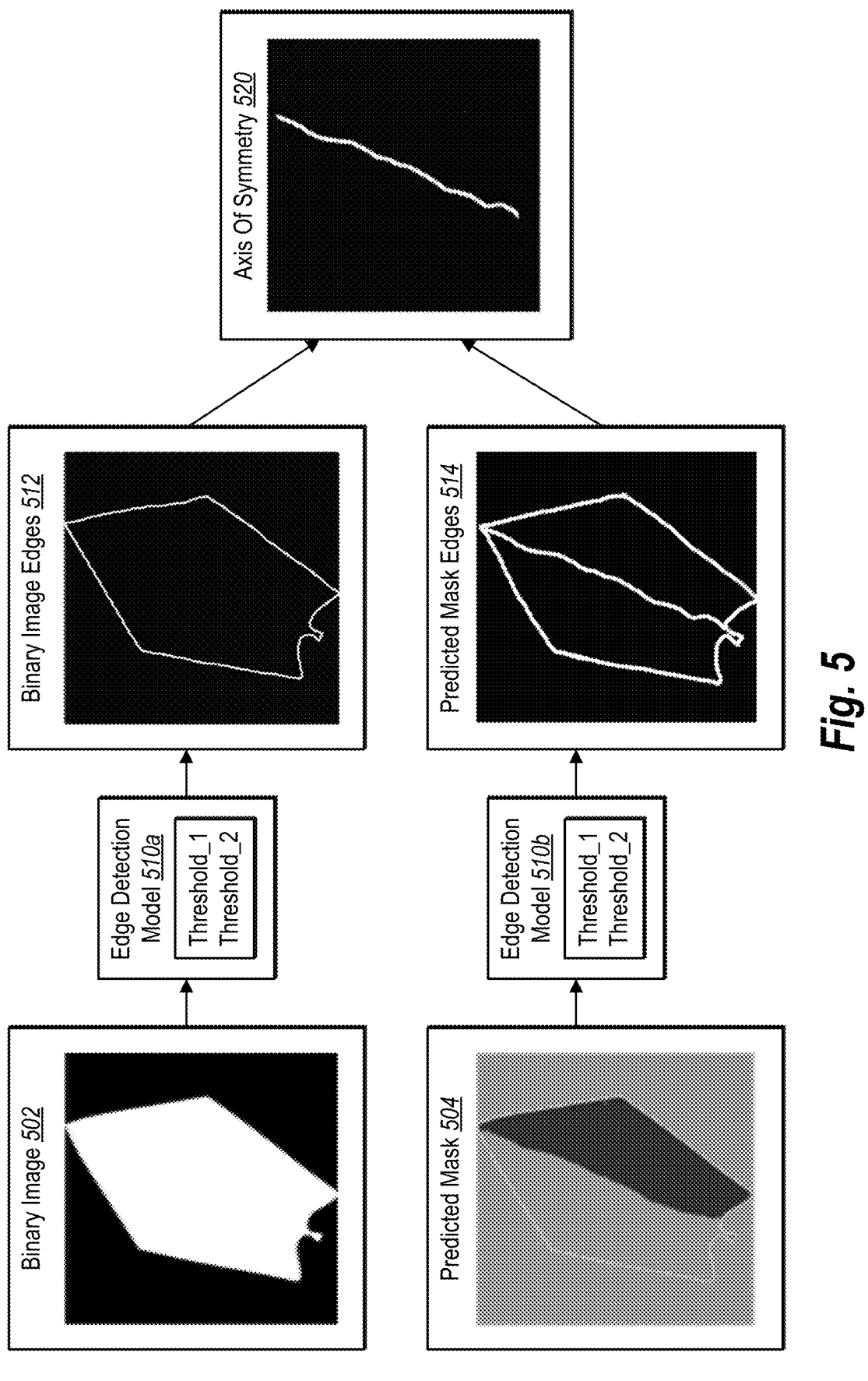
FIG. 5 illustrates an example of utilizing a symmetry axis detection model to generate an axis of symmetry in accordance with one or more embodiments.

As mentioned, the custom arrow generation system 106 utilizes a symmetry axis detection model to determine an axis of symmetry. FIG. 5 illustrates an example of utilizing a symmetry axis detection model to generate an axis of symmetry in accordance with one or more embodiments. As shown, the custom arrow generation system 106 utilizes a symmetry axis detection model to determine an axis of symmetry 520 by determining symmetry pixels associated with an intersection of the first half segment and the second half segment. The custom arrow generation system 106 fits a line to the symmetry pixels. As shown, the custom arrow generation system 106 utilizes the symmetry axis detection model to perform an edge detection 510_a_ to determine binary image edges 512 from the binary image 502 (e.g., the binary image generated from the digital object). In particular, the symmetry axis detection model generates binary image edges 512 that around the shape of the digital object (e.g., outline).

In addition, the custom arrow generation system 106 utilizes the symmetry axis detection model to perform an edge detection 510_b_ to determine predicted mask edges 514 from the predicted mask 504 (e.g., the predicted mask generated by the bilateral segmentation machine-learning model from the digital object). In particular, the symmetry axis detection model generates predicted mask edges 514 around the first half segment and the second half segment. that correspond to the shape (e.g., outline) of the first half segment and the second half segment. As shown, predicted mask edges 514 include a separation line corresponding to the axis of symmetry and segmentation edges that correspond to the shape of the digital object. In certain embodiments, the custom arrow generation system 106 converts pixels with value 1 to a value of 127 and pixels with a value of 2 to a value of 255 for the binary image edges 512 and the predicted mask edges 514.

As further shown, the custom arrow generation system 106 utilizes the symmetry axis detection model to determine a difference between the binary image edges 512 and the predicted mask edges 514 to generate the axis of symmetry 520. For example, the symmetry axis detection model subtracts the pixel values of the binary image edges 512 from the pixel values of the predicted mask edges 514 to determine symmetry pixels.

In one or more embodiments, the symmetry axis detection model performs additional post-processing to account for cases in which the binary image edges 512 and the predicted mask edges 514 do not perfectly align. For example, the symmetry axis detection model performs the edge detection 510_a_ with a threshold_1=0.5 and a threshold_2=1.0 to determine the binary image edges 512. In addition, the symmetry axis detection model performs the edge detection 510_b_ with a threshold_1=50 and a threshold_2=150 to determine the predicted mask edges 514. Furthermore, the symmetry axis detection model generates a similarity map to highlight significant differences between the binary image edges 512 and the predicted mask edges 514.

To further refine the similarity map and determine symmetry pixels, in one or more embodiments, the custom arrow generation system 106, utilizing the symmetry axis detection model, uses a threshold on the similarity map (e.g., thresholding by a factor of 0.00005) to produce a significant difference mask. For example, the symmetry axis detection model erodes the significant difference mask using a Gaussian blur on one or more of the segmentation edges (e.g., binary image edges 512 and/or predicted mask edges 514) to smooth the output. In some embodiments, the symmetry axis detection model utilizes a kernel size of (13,13) for the Gaussian blur. Further, the symmetry axis detection model utilizes thinning to transform one or more of the segmentation edges (e.g., binary image edges 512 and/or predicted mask edges 514) into a skeletal representation, where each component is reduced to a single-pixel-wide structure. The symmetry axis detection model selects the symmetry pixels on the largest connected component of the skeletal representation as the axis of symmetry 520.

In addition, the symmetry axis detection model determines a line that fits the symmetry pixels corresponding to the axis of symmetry 520 and the intersection of the first half segment and the second half segment. For example, the symmetry axis detection model utilizes $(x_i, y_i)$ to represent the coordinates of white points in the image, where $x_i$ and $y_i$ correspond to the respective pixel positions. The symmetry axis detection model utilizes a linear regression model to fit a line that minimizes the sum of squared vertical deviations (e.g., errors) from the points to the line. For example, the symmetry axis detection model utilizes a linear regression equation:

$$y = mx + b$$

where:

y=The dependent variable representing the y-coordinate of a point x=The independent variable representing the x-coordinate of a point m=The slope of the regression line b=The y-intercept of the repression line The symmetry axis detection model utilizes the linear regression equation to find the values of m and b that minimize the sum of squared vertical deviations (or errors) between the actual y values of the white points ($y_i$) and the y values predicted by the linear regression line $mx_i$+b. In certain embodiments, the symmetry axis detection model utilizes the least squares method to calculate m and b to minimize the sum of the squared differences between the actual $y_i$ and the predicted $mx_i$+b. For example, the symmetry axis detection model determines the optimal values of m and b by minimizing the cost function:

$$J(m, b) = \frac{1}{2n}\sum_{i=1}^{n}(mx_i + b - y_i)^2$$

where −n is the number of white points in the image. In one or more embodiments, the symmetry axis detection model utilizes the slope of this line to determine (or approximate) the axis of symmetry 520.

Figure 6A:
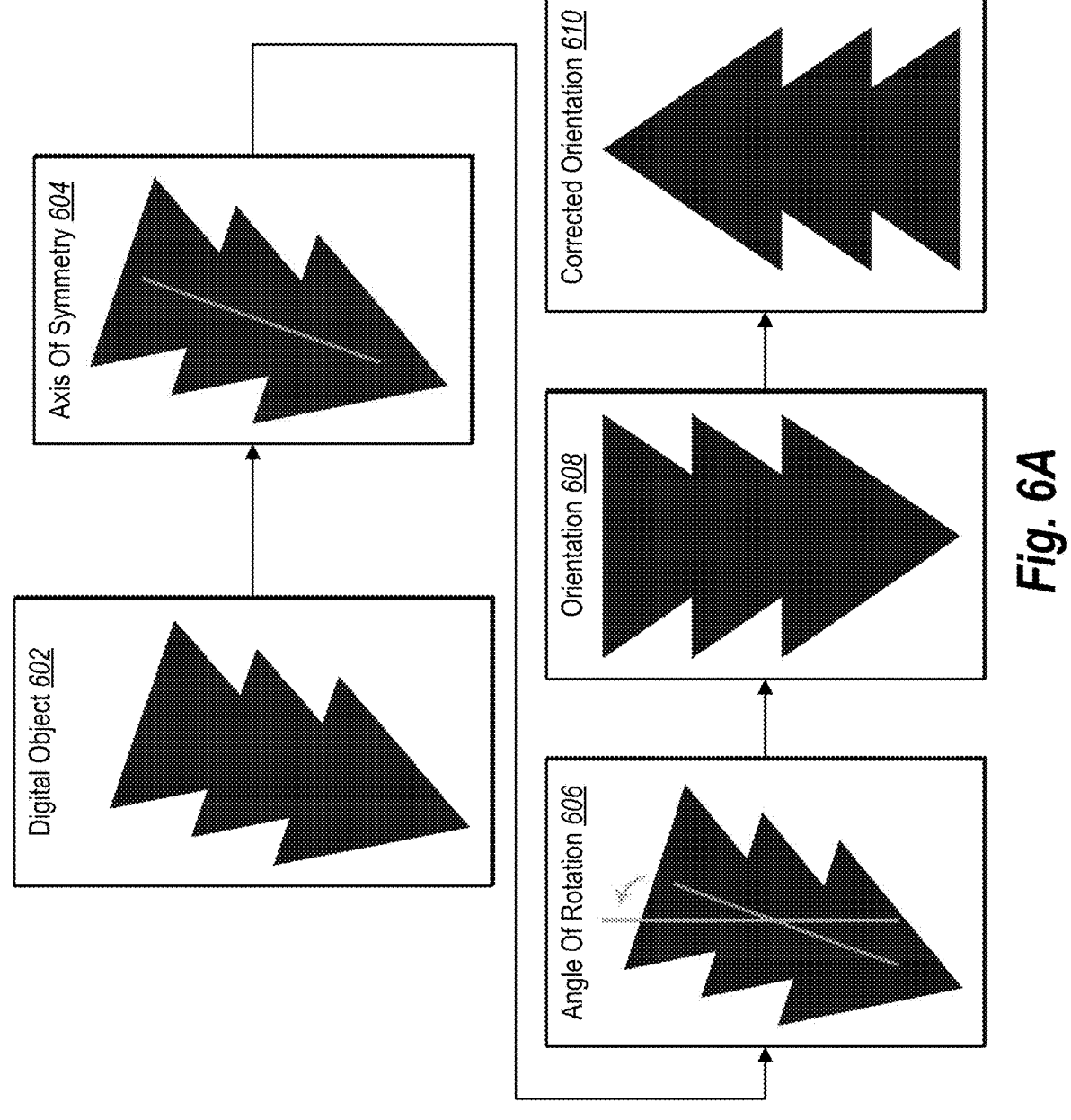
FIG. 6A illustrates an example of determining an orientation for a digital object in accordance with one or more embodiments.
Figure 6B:
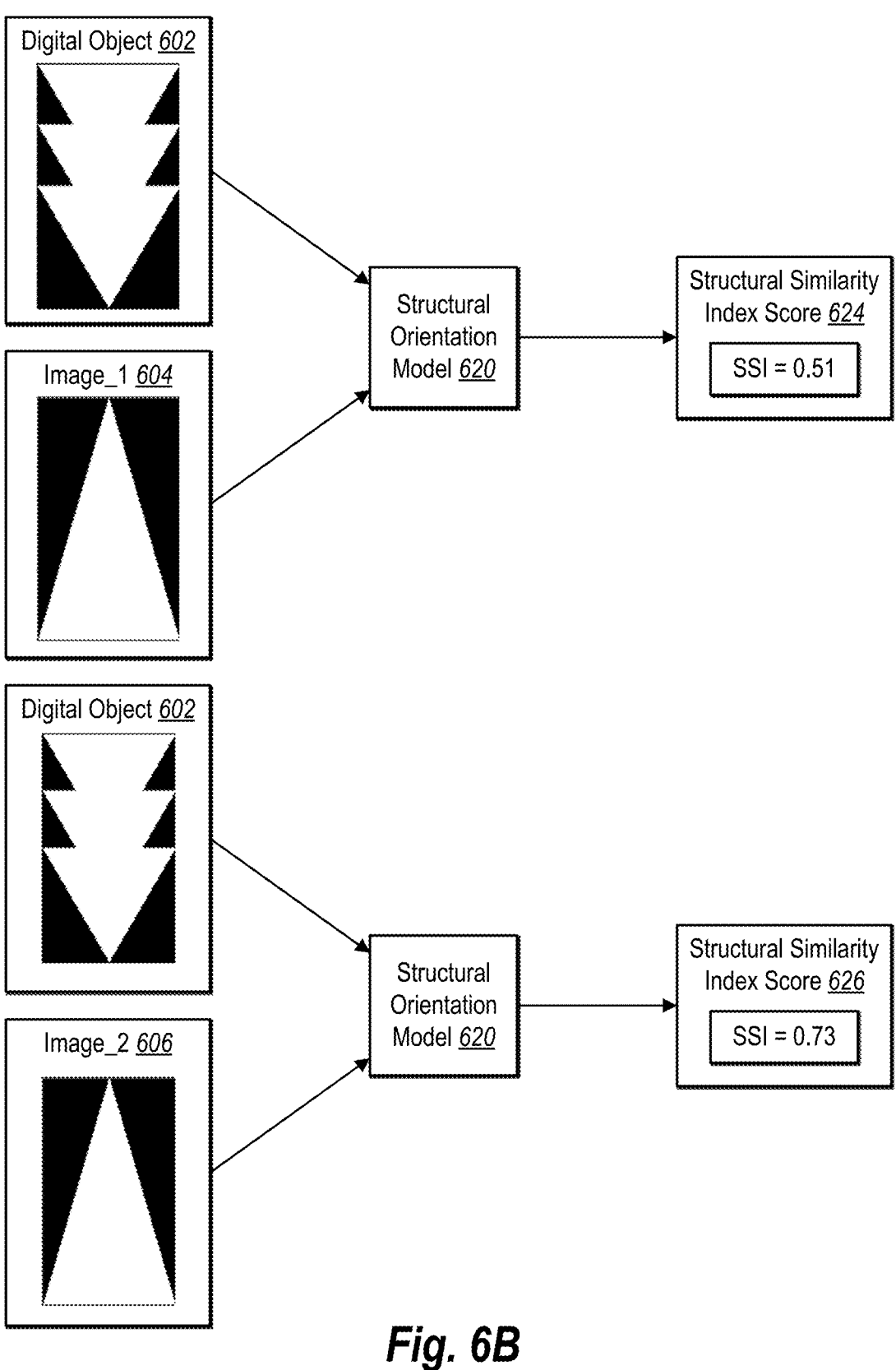
FIG. 6B illustrates an example of utilizing a structural orientation model to determine an orientation for a digital object in accordance with one or more embodiments.

As mentioned, the custom arrow generation system 106 rotates a digital object to align with a path segment to create a custom arrow. In some cases, the digital object needs to be rotated between 0 and 180 degrees to have a suitable orientation for an arrowhead. In other cases, the digital object is in an inverted orientation and needs to be rotated an additional 180-degrees to have a suitable orientation for an arrowhead. As shown in FIGS. 6A-6B, the custom arrow generation system 106 determines an orientation and rotation utilizing a structural similarity index. FIG. 6A illustrates an example of determining an orientation for an arrowhead in accordance with one or more embodiments. FIG. 6B illustrates an example of utilizing a structural similarity index to determine an orientation for an arrowhead in accordance with one or more embodiments.

To illustrate, as shown in FIG. 6A, the custom arrow generation system 106 determines or selects a digital object 602. As suggested by the orientation of the digital object 602, the digital object 602 includes an orientation that is not suitable for being an arrowhead due to being largely inverted. In particular, the custom arrow generation system 106 rotates the digital object 602 an additional 180-degrees to provide the correct aesthetic appearance of directionality for the arrowhead as discussed in detail below.

As shown and discussed in relation to FIG. 5, the custom arrow generation system 106 determines an axis of symmetry 604. The axis of symmetry 604 is used to determine the orientation 608 for the digital object 602. To illustrate, in one or more embodiments, the custom arrow generation system 106 utilizes a structural orientation model (e.g., structural orientation model 620) to determine an angle of rotation 606 and rotate the digital object 602 such that the axis of symmetry 604 aligns with the tangent at the corresponding endpoint of the path segment (e.g., Bézier path, vector path). However, although the custom arrow generation system 106 rotates the digital object such that the axis of symmetry 604 aligns with the tangent at the corresponding endpoint of the path segment as shown by orientation 608, the digital object 602 may appear inverted based on its structural orientation.

To account for the digital object 602 appearing inverted, the custom arrow generation system 106 determines if an additional 180-degree rotation is required such that the digital object 602 appears directionally appropriate and aligned with the direction of the path segment. As shown, if the custom arrow generation system 106 determines that an additional rotation is suitable (e.g., the arrowhead is inverted), the custom arrow generation system 106 rotates the digital object 180-degrees to a corrected orientation 610.

To determine whether the digital object 602 requires additional rotation to account for an inverted structural orientation of the digital object 602, the custom arrow generation system 106 utilizes a structural orientation model 620. FIG. 6B illustrates an example of utilizing a structural orientation model 620 to determine an orientation for the digital object 602 in accordance with one or more embodiments.

As shown, the custom arrow generation system 106 utilizes a structural orientation model 620 to determine structural similarity scores and align the digital object 602 with the path segment. In particular, the structural orientation model 620 determines a structural similarity index score for the digital object 602 by comparing the digital object 602 with an image of a tapered shape oriented to convey directionality and pointing in opposite directions. As shown by Image_1 604 and Image_2 606 (which are the same image only inverted with respect to each other), in one or more embodiments, the structural orientation model 620 utilizes an isosceles triangle pointing in opposite (e.g., upward and downward) directions. In one or more embodiments, the structural orientation model 620 utilizes a tapered shape pointing in the direction of, and opposite the direction of, the tangent of the path segment. Notably, in one or more embodiments, the structural orientation model 620 utilizes a variety of tapered shapes and a variety of directions.

To illustrate, the structural orientation model 620 utilizes a combination of an upward oriented/pointing isosceles triangle (e.g., Image_1 604) and a downward oriented/pointing isosceles triangle (e.g., Image_2 606) to determine an orientation for the digital object 602. In particular, the structural orientation model 620 compares the structure of the digital object 602 to the structure of each isosceles triangle to determine a structural similarity index score that measures the structural similarity between the images. To illustrate, the structural orientation model 620 compares the structure of the digital object 602 to the structure of Image_1 604 to determine a structural similarity index score 624 that measures the structural similarity between the images. Further, the structural orientation model 620 compares the structure of the digital object 602 to the structure of Image_2 606 to determine a structural similarity index score 626 that measures the structural similarity between the images. The structural orientation model 620 determines an end of the digital object 602 to attach to the path segment based on comparing the structural similarity index score 624 and the structural similarity index score 626.

For example, the custom arrow generation system 106 determines the structural similarity index score (SSI) as follows:

$$SSI(x, y) = \frac{2 \cdot \mu_x \cdot \mu_y + C_1}{\mu_x^2 \cdot \mu_y^2 + C_1} \cdot \frac{2 \cdot \sigma_{xy} + C_2}{\sigma_x^2 \cdot \sigma_y^2 + C_2}$$

where:
  $\mu_x$=Mean of the first image
  $\mu_y$=Mean of the second image
  $\sigma_x$=Standard deviation of the first image
  $\sigma_y$=Standard deviation of the second image
  $\sigma_{xy}$=Covariance between the first and second images
  $C_1=(k_1 \cdot L)^2$ (Constant, generally $C_1$=0.01)
  $C_2=(k_2 \cdot L)^2$ (Constant, generally $C_2$=0.03)
  L=Dynamic range of pixel values (usually the max pixel value)
  $k_1$=0.01, $k_2$=0.03 (Constants to stabilize the division)

Based on the SSI, the structural orientation model 620 determines whether to rotate the digital object 602 an additional 180-degrees. If the SSI for the downward pointing isosceles triangle is higher than the SSI for the upward pointing isosceles triangle, the custom arrow generation system 106 rotates the digital object 602 an additional 180-degrees.

To illustrate, as described in relation to FIG. 6A and shown in FIG. 6B, the structural orientation model 620 rotates the digital object 602 such that the axis of symmetry 604 aligns with the tangent at the corresponding endpoint of the path segment (e.g., Bézier path, vector path). As shown, this rotation rotates the digital object 602 so the axis of symmetry is parallel to an axis of symmetry of the tapered objects of the Image_1 604 and the Image_2 606. As shown in FIG. 6B, the custom arrow generation system 106 utilizes the structural orientation model 620 to compare the digital object 602 to the Image1 604 to determine a structural similarity index score 624 of 0.51 between the digital object 602 and the tapered object oriented in a top-up orientation. Further, the custom arrow generation system 106 utilizes the structural orientation model 620 to compare the digital object 602 to the Image2 606 to determine a structural similarity index score 626 of 0.73 between the digital object 602 and the tapered object oriented in a top-down orientation. The custom arrow generation system 106 utilizes the structural orientation model 620 to compare the structural similarity index score 624 and the structural similarity index score 626 to determine a top end and a bottom end of the digital object for attaching the digital object to the endpoint of the path segment. Based on the SSI scores, and as mentioned in reference to FIG. 6A, the custom arrow generation system 106 rotates the digital object 602 180-degrees to a corrected orientation 610.

In one or more embodiments, the custom arrow generation system 106 utilizes a hybrid approach to determine the axis of symmetry. In particular, in certain embodiments, the custom arrow generation system 106 determines an axis of symmetry as described in relation to FIG. 5. Further, the custom arrow generation system 106 rotates the digital object as described in relation to FIGS. 6A-6B. Moreover, the custom arrow generation system 106 re-evaluates the digital object to determine the axis of symmetry on the rotated digital object. In this case, the custom arrow generation system 106 utilizes a second method to determine the axis of symmetry on the rotated digital object by extracting spatial features, analyzing the spatial distribution of spatial features, and using pattern recognition techniques to identify symmetrical features across the digital object. By utilizing the hybrid approach, the custom arrow generation system 106 re-evaluates and adjusts to determine the axis of symmetry more accurately for the digital object.

Figure 7:
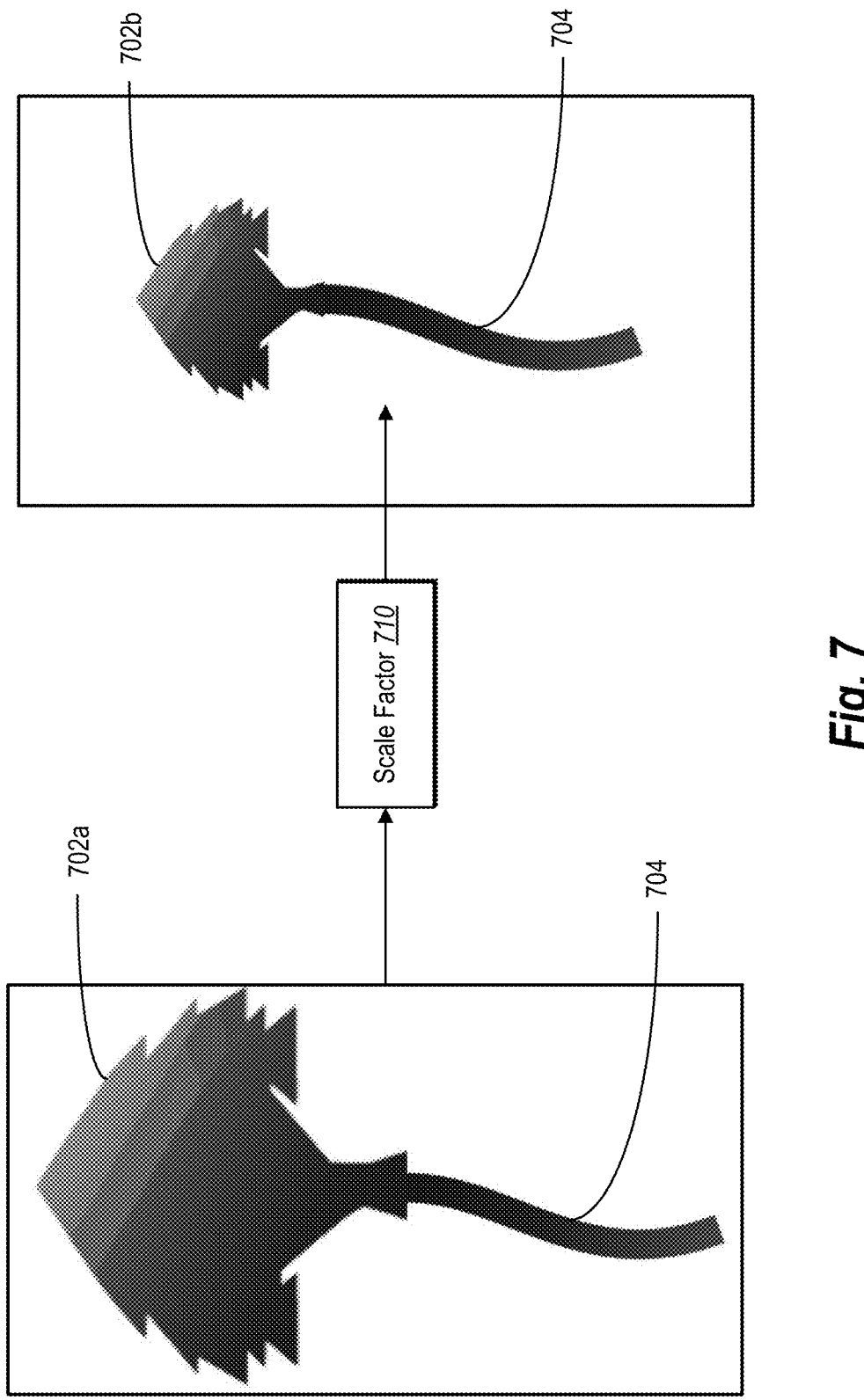
FIG. 7 illustrates an example of utilizing a scale factor to scale an arrowhead in accordance with one or more embodiments.

As mentioned, the custom arrow generation system 106 scales the digital object such that it appears appropriately sized for the dimensions of the path segment. FIG. 7 illustrates an example of utilizing a scale factor to scale an arrowhead in accordance with one or more embodiments. As shown in FIG. 7, the custom arrow generation system 106 scales the digital object 702a based on the dimensions of the path segment 704. In particular, the custom arrow generation system 106 determines a scale factor to scale the digital object 702a based on the width of the digital object, the height of the digital object, and the width (or stroke size) of the path segment 704. In certain embodiments, the custom arrow generation system 106 utilizes a ratio where, for a given path segment stroke size (e.g., width), the digital object is scaled such that the largest digital object dimension is 9 times the stroke size of the path segment. For example, the custom arrow generation system 106 determines a scale factor 710 as follows:

$$\text{Scale Factor} = \frac{1}{\max(\text{width, height})} \times \frac{9}{\text{stroke}}$$

where:
  width: width of the digital object
  height: height of the digital object
  stroke: stroke size (width) of the path segment As shown, the custom arrow generation system 106 utilizes the scale factor 710 to resize, or scale, the digital object 702a to visually correspond to the size of the path segment 704 as shown by the digital object 702b.

Figure 8:
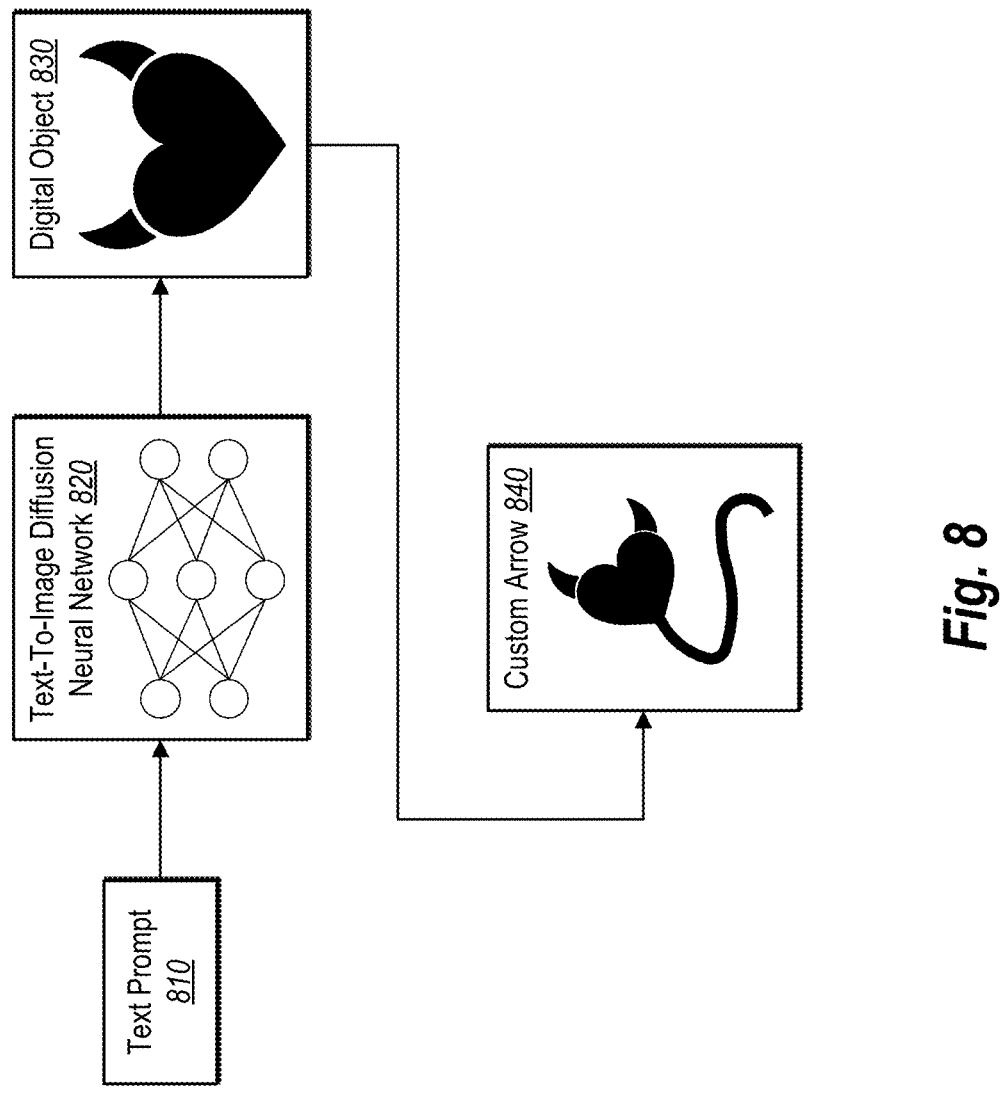
FIG. 8 illustrates an example of utilizing a text-to-image diffusion neural network to generate a digital object and utilizing the custom arrow generation system to generate a custom arrow from the digital object in accordance with one or more embodiments.

As mentioned, in one or more implementations, the custom arrow generation system 106 generates a custom arrow based on a text prompt utilizing a text-to-image diffusion neural network. FIG. 8 illustrates an example of utilizing a text-to-image diffusion neural network to generate a custom arrow in accordance with one or more embodiments.

As shown, the custom arrow generation system 106 receives a text prompt 810. The text prompt 810 includes details about design, style, and features of the desired custom arrow or digital object (e.g., custom arrowhead object). For example, the text prompt 810 includes specific visual elements and styles that provide a clear description of the digital object 830.

The text-to-image diffusion neural network 820 is a type of generative model that creates images from textual descriptions. In one or more embodiments, the text-to-image diffusion neural network 820 is trained on a dataset consisting of images and their corresponding textual descriptions. During training, the text-to-image diffusion neural network 820 learns a forward diffusion process that includes gradually adding noise to the image until it turns into random noise. Simultaneously, the text-to-image diffusion neural network 820 learns the reverse process, which involves removing noise from a noisy image to recreate the original image (denoising). The text-to-image diffusion neural network 820 learns to associate specific textual descriptions with their corresponding images during this denoising process.

To illustrate, the custom arrow generation system 106 provides the text prompt 810 to the text-to-image diffusion neural network 820 to generate the digital object 830. In particular, the text-to-image diffusion neural network 820 starts with noise and gradually refines the noise into a coherent image that matches the text prompt 810. For example, the model uses the text prompt 810 to condition the generation process, which guides the noise reduction in such a way that the final image matches the text prompt 810. Over multiple steps, the text-to-image diffusion neural network 820 applies its learned reverse diffusion process, progressively denoising the image. To illustrate, based on the text prompt 810 of "generate a custom arrowhead based on the theme of a heart with horns that reflects a blend of affectionate and mischievous qualities," the text-to-image diffusion neural network generates the digital object 830 (of a heart with horns).

Furthermore, as described in relation to the previous figures, the custom arrow generation system 106 generates the custom arrow 840 from the digital object 830 and a path segment. In particular, in one or more implementations, the custom arrow generation system 106 determines an axis of symmetry for the digital object and rotates the digital object based on aligning the axis of symmetry with a calculated orientation. In addition, the custom arrow generation system 106 orients the digital object (and the axis of symmetry) to align with the tangent of the endpoint of a Bézier path such that the digital object gives the visual impression of pointing in the direction of the endpoint of the Bézier path. Further, in certain implementations, the custom arrow generation system 106 resizes the digital object to aesthetically match the dimensions of the Bézier path.

Figure 9:
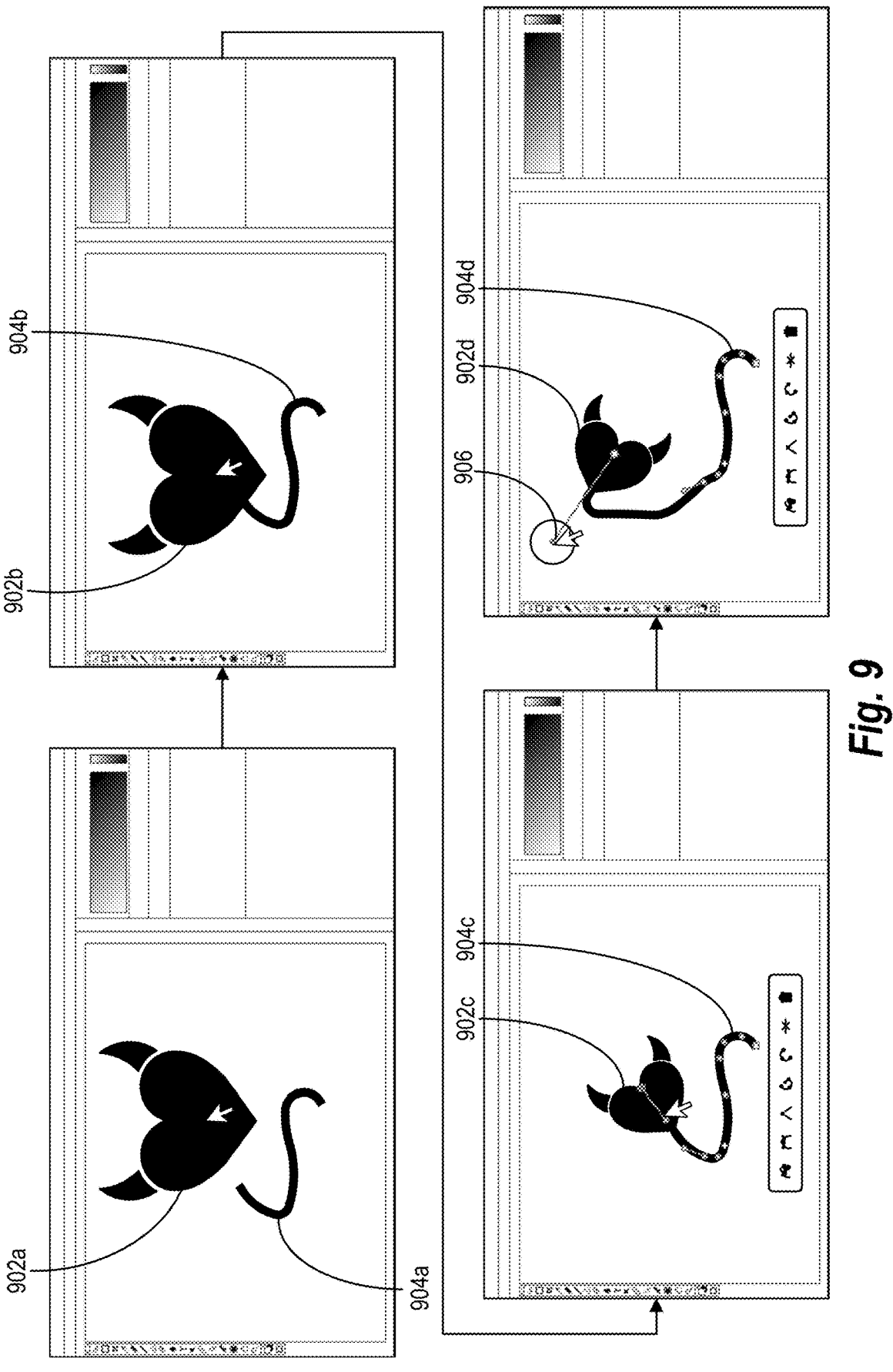
FIG. 9 illustrates a series of graphical user interfaces utilized for generating a custom arrow in accordance with one or more embodiments.

To further illustrate, the custom arrow generation system 106 provides an efficient, intuitive user interface for creating custom arrows by combining digital objects and path segments. FIG. 9 illustrates an example of utilizing graphical user interfaces provide by the custom arrow generation system 106 to generate a custom arrow in accordance with one or more embodiments. As shown, the custom arrow generation system 106 interacts with a vector-based application which includes a digital object 902a (e.g., digital object 830) and a path segment 904a (e.g., a Bézier path). As shown, based on a client device interaction, the digital object 902a is moved (by either the custom arrow generation system 106 or the vector-based application) to a position over, or near, the path segment 904a as shown by digital object 902b and path segment 904b. For example, in one or more embodiments, the vector-based application moves the digital object 902a to a position over the over the path segment 904a as shown by digital object 902b and path segment 904b. In other embodiments, based on a user device interaction with the vector-based application, the custom arrow generation system 106 moves the digital object 902b over the path segment 904a as shown by digital object 902b and path segment 904b.

As further shown, the custom arrow generation system 106 automatically combines the digital object 902b with the path segment 904b to create a custom arrow without user input other than the client device interaction as shown by the combination of digital object 902c and path segment 904c. For example, when the digital object 902c is within a threshold distance of the endpoint of the path segment 904c (e.g., 5x, 8px, 10px), the custom arrow generation system 106 aligns, resizes, and attaches the digital object 902c to the path segment 904c. In particular, based on a single step activation of the custom arrow generation system 106, the custom arrow generation system 106 automatically rotates and resizes the digital object 902c to connect with path segment 084c and create the custom arrow.

Notably, the custom arrow generation system 106 provides a single click interface to generate the custom arrow. Indeed, through the use of the streamlined client device interface, the vector-based application (or custom arrow generation system 106) simply positions the digital object 902c over the path segment 904c and activates the custom arrow generation system 106 based upon a single client device interaction (or request) to create the custom arrow. In certain embodiments, the client device selects the endpoint of the path segment and the digital object and invokes the custom arrow generation system 106. In this case, the custom arrow generation system 106 generates the custom arrow by moving, resizing, and aligning the selected digital object with the tangent of the selected endpoint (and thus creating the custom arrow with a single click menu activation).

As further shown in FIG. 8, the digital object is integrated with the path segment based on the tangent of the endpoint of the path segment to create the custom arrow as illustrated by the custom arrow that includes the digital object 902d and the path segment 904d. As shown, based on a client device interaction, the client device moves the digital object and the associated path segment and maintains the integrity of the custom arrow. For example, based on a client device interaction to move the control handle 906, the association between digital object 902d and path segment 904d based upon the tangent of the endpoint of the path segment 904d remains intact.

Figure 10:
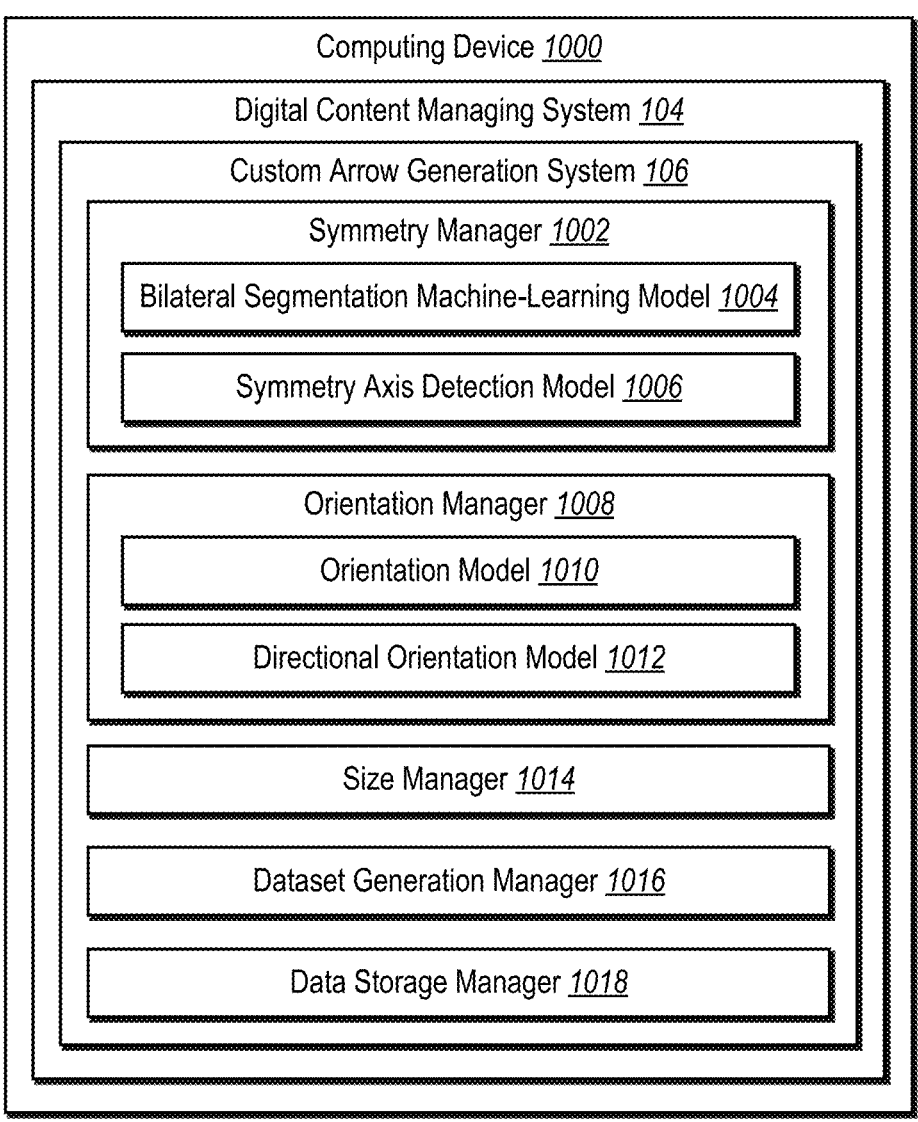
FIG. 10 illustrates a diagram of an example architecture of the custom arrow generation system in accordance with one or more implementations.

Turning now to FIG. 10, additional detail will now be provided regarding various components and capabilities of the custom arrow generation system 106. In particular, FIG. 10 illustrates the custom arrow generation system 106 implemented by the computing device 1000 (e.g., the server device(s) 102 and/or one of the client device(s) 110 discussed above with reference to FIG. 1). Additionally, the custom arrow generation system 106 is also part of the digital design creation and editing system 104. As shown in FIG. 10, the custom arrow generation system 106 includes, but is not limited to, a symmetry manager 1002, an orientation manager 1008, a size manager 1014, a dataset generation manager 1016, and a data storage manager 1018.

As just mentioned, and as illustrated in FIG. 10, the custom arrow generation system 106 includes the symmetry manager 1002. In one or more embodiments, the symmetry manager 1002 manages the determination of the axis of symmetry for a digital object. The symmetry manager 1002 utilizes a bilateral segmentation machine-learning model 1004 to segment a digital object and bisecting the digital object into two symmetrical halves. In addition, the symmetry manager 1002 utilizes a symmetry axis detection model 1006 to determine an axis of symmetry that runs from the point side down the center of the digital object to the base side of the digital object. The symmetry manager 1002 utilizes the bilateral segmentation machine-learning model 1004, the symmetry axis detection model 1006, the post-processing techniques, and linear regression to find a line that best describes the pixels along the axis of symmetry.

Additionally, as shown in FIG. 10, the custom arrow generation system 106 includes the orientation manager 1008. The orientation manager 1008 manages the orientation of a digital object and aligns the digital object with a path segment to create the custom arrow. In particular, the orientation manager 1008 utilizes a structural orientation model 1010 to determines an angle of rotation to rotate and align the digital object with the path segment. For example, the orientation manager 1008 utilizes the structural orientation model 1010 to determine whether the digital object needs to be rotated between 0-180 degrees to align with the tangent of the endpoint of the path segment. In addition, the orientation manager 1008 utilizes a directional structural orientation model to determine the directional orientation for the digital object in relation to the path segment. For example, the orientation manager 1008 utilizes the directional structural orientation model 1012 to determine whether to digital object needs to be rotated an additional 180-degrees to have a suitable orientation for an arrowhead.

As further shown in FIG. 10, the custom arrow generation system 106 includes the size manager 1014. In particular, the custom arrow generation system 106 utilizes the size manager 1014 to determine an appropriate size for the digital object based on an associated path segment. In particular, the size manager 1014 scales the digital object based on the width of the path segment. In particular, the size manager 1014 determines a scale factor to scale the digital object based on the width of the digital object, the height of the digital object, and the width (or stroke size) of the path segment.

In addition, as shown in FIG. 10, the custom arrow generation system 106 includes the dataset generation manager 1016. The dataset generation manager 1016 manages the generation of training data for the bilateral segmentation machine-learning model. For example, the dataset generation manager 1016 generates a dataset that includes Bézier paths that feature a wide array of designs with differing levels of complexity and with a multitude of shapes and orientations. The dataset generation manager 1016 generates a dataset with multiple orientations of the axis of symmetry to introduce variability into the training dataset.

Additionally, as shown, the custom arrow generation system 106 includes data storage manager 1018. In particular, data storage manager 1018 (implemented by one or more memory devices) stores the digital design documents, including the custom arrow content. The data storage manager 1018 facilitates the use of the digital design documents by the custom arrow generation system 106.

Each of the components 1002-1018 of the custom arrow generation system 106 can include software, hardware, or both. For example, the components 1002-1018 can include one or more instructions stored on a computer-readable storage medium and executable by processors of one or more computing devices, such as a client device or server device. When executed by the one or more processors, the computer-executable instructions of the custom arrow generation system 106 can cause the computing device(s) to perform the methods described herein. Alternatively, the components 1002-1018 can include hardware, such as a special-purpose processing device to perform a certain function or group of functions. Alternatively, the components 1002-1018 of the custom arrow generation system 106 can include a combination of computer-executable instructions and hardware.

Furthermore, the components 1002-1018 of the custom arrow generation system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1002-1018 of the custom arrow generation system 106 may be implemented as a stand-alone application, such as a desktop or mobile application. Furthermore, the components 1002-1018 of the custom arrow generation system 106 may be implemented as one or more web-based applications hosted on a remote server. Alternatively, or additionally, the components 1002-1018 of the custom arrow generation system 106 may be implemented in a suite of mobile device applications or "apps." For example, in one or more embodiments, the custom arrow generation system 106 can comprise or operate in connection with digital software applications such as: ADOBE® PHOTOSHOP CC, ADOBE® ILLUSTRATOR CC, ADOBE® EXPRESS, ADOBE® PROTEUS, ADOBE® XD, ADOBE® INDE-SIGN CC, ADOBE® SPARK POST, or ADOBE® CC WEB, ADOBE® ACROBAT PROJECT LINCOLN. The foregoing are either registered trademarks or trademarks of Adobe Inc. in the United States and/or other countries.

Figure 11:
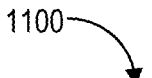
FIG. 11 illustrates a flowchart of a series of acts for creating a custom arrow in accordance with one or more embodiments.
Figure 11:
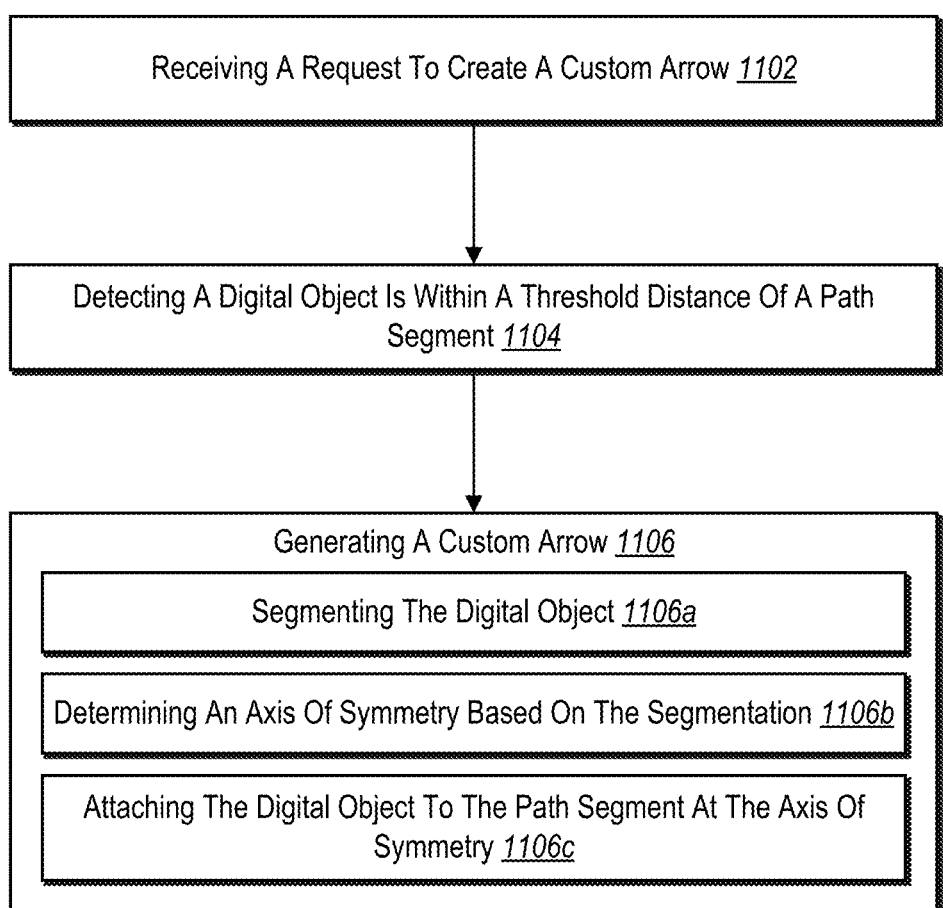

FIGS. 1-10, the corresponding text, and the examples provide a number of different methods, systems, devices, and non-transitory computer-readable media of the custom arrow generation system 106. In addition to the foregoing, one or more embodiments can also be described in terms of flowcharts comprising acts for accomplishing a particular result, as shown in FIG. 11. The acts shown in FIG. 11 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIG. 11. In some embodiments, a system can be configured to perform the acts of FIG. 11. Alternatively, the acts of FIG. 11 can be performed as part of a computer-implemented method.

FIG. 11 illustrates a flowchart of a series of acts 1100 for modifying a digital document with a custom arrow generation system 106 in accordance with one or more embodiments. While FIG. 11 illustrates acts according to one embodiment, alternative embodiments may omit, add to, reorder, and/or modify any acts shown in FIG. 11.

FIG. 11 illustrates an example series of acts 1100 for utilizing a custom arrow generation system 106 to generate a custom arrow. In particular, in certain embodiments, the series of acts 1100 includes an act 1102 of receiving a request to create a custom arrow. Specifically, in one or more embodiments, the act 1102 includes receiving a client device interaction indicating a request to create a custom arrow object. In particular, in certain embodiments, the series of acts 1100 includes an act 1104 of detecting a digital object is within a threshold distance of a path segment. Specifically, in one or more embodiments, the act 1102 includes detecting, based on the client device interaction, that a digital object is within a threshold distance of an endpoint of a path segment. As illustrated, in some embodiments, the series of acts 1100 also includes an act 1106 of generating a custom arrow and the sub-act 1106a of segmenting the digital object, the sub-act 1106b of determining an axis of symmetry based on the segmentation, and the sub-act 1106c of attaching the digital object to the path segment at the axis of symmetry. In particular, the act 1106 includes generating a custom arrow object based on the digital object being within the threshold distance by: segmenting, utilizing a bilateral segmentation machine-learning model, the digital object into a first half segment and a second half segment; determining, utilizing a symmetry axis detection model, an axis of symmetry of the digital object based on the first half segment and the second half segment; and attaching the digital object to an endpoint of the path segment at the axis of symmetry.

In addition (or in the alternative) to the acts described above, in certain embodiments, the custom arrow generation system series of acts 1100 includes determining a tangent of the endpoint of the path segment. In some embodiments, the series of acts 1100 also includes rotating the digital object to align the axis of symmetry with the tangent of the endpoint of the path segment. Moreover, in one or more embodiments, the custom arrow generation system 106 series of acts 1100 includes determining symmetry pixels associated with an intersection of the first half segment and the second half segment. Further still, in some embodiments, the custom arrow generation system 106 series of acts 1100 includes determining a line corresponding to the symmetry pixels utilizing linear regression.

Furthermore, in one or more embodiments, the custom arrow generation system series of acts 1100 includes determining, utilizing an edge detection model, edges around the digital object. Moreover, one or more embodiments, the series of acts 1100 includes determining, utilizing the edge detection model, segmentation edges around the first half segment and the second half segment. Further still, in one or more embodiments, the series of acts 1100 includes determining the symmetry pixels by subtracting the edges around the digital object from the segmentation edges around the first half segment and the second half segment. Moreover, in one or more embodiments, the series of acts 1100 includes applying a gaussian blur to one or more of the segmentation edges around the first half segment and the second half segment or the edges around the digital object. In certain embodiments, the series of acts 1100 further includes thinning one or more of the segmentation edges around the first half segment and the second half segment or the edges around the digital object.

Moreover, one or more embodiments, the series of acts 1100 includes determining, utilizing an orientation model, a first structural similarity index score between the digital object and a tapered object oriented in a first direction. Furthermore, in one or more embodiments, the series of acts 1100 includes determining, utilizing the orientation model, a second structural similarity index score between the digital object and the tapered object oriented in a second direction. Moreover, in one or more embodiments, the series of acts 1100 includes determining an end of the digital object to attach to the path segment based on comparing the first structural similarity index score and the second structural similarity index score.

In one or more embodiments, the series of acts 1100 includes utilizing a transformer-based neural network to classify pixels in an image comprising the digital object as background pixels, first half pixels, or second half pixels. Further still, in one or more embodiments, the series of acts 1100 includes determining a scale factor by comparing a width of the digital object, a height of the digital object, and a width of the path segment. Moreover, in one or more embodiments, the series of acts 1100 includes scaling the digital object based on the scale factor. In one or more embodiments, the series of acts 1100 further includes receiving a text prompt indicating an object to generate. In addition, in one or more embodiments, the series of acts 1100 generating the digital object from the text prompt utilizing a text-to-image diffusion neural network.

Furthermore, in one or more embodiments, the series of acts 1100 includes generating the custom arrow object is performed without user input other than the client device interaction. In addition, in one or more embodiments, the series of acts 1100 includes segmenting, utilizing a transformer-based neural network, a digital object into a first half segment and a second half segment by classify pixels in an image comprising the digital object as background pixels, first half pixels, or second half pixels. Moreover, in one or more embodiments, the series of acts 1100 includes determining an axis of symmetry of the digital object based on the first half segment and the second half segment. In one or more embodiments, the series of acts 1100 includes generating a custom arrow by attaching the digital object to an endpoint of a path segment at the axis of symmetry.

Furthermore, in one or more embodiments, the series of acts 1100 includes determining, based on a structural orientation of the digital object, the digital object is inverted relative to the path segment. In some embodiments, the series of acts 1100 also includes rotating the digital object to be aligned with a direction of the path segment. Moreover, in one or more embodiments, the custom arrow generation system 106 series of acts 1100 includes determining symmetry pixels associated with an intersection of the first half segment and the second half segment. Further still, in some embodiments, the custom arrow generation system 106 series of acts 1100 includes fixing a line to the symmetry pixels.

Furthermore, in one or more embodiments, the custom arrow generation system series of acts 1100 includes rotating the digital object so the axis of symmetry is parallel to an axis of symmetry of a tapered object. Moreover, one or more embodiments, the series of acts 1100 includes determining, utilizing a structural orientation model, a first structural similarity index score between the digital object and the tapered object oriented in a top-up orientation. Further still, in one or more embodiments, the series of acts 1100 includes determining, utilizing the structural orientation model, a second structural similarity index score between the digital object and the tapered object oriented in a top-down orientation. Moreover, in one or more embodiments, the series of acts 1100 includes comparing the first structural similarity index score and the second structural similarity index score to determine a top end and a bottom end of the digital object, wherein attaching the digital object to the endpoint of the path segment at the axis of symmetry comprises attaching the bottom end of the digital object to the endpoint of the path segment.

In certain embodiments, the series of acts 1100 further includes generating parameters for the transformer-based neural network based on a synthetic dataset of symmetrical shapes rotated to different angles. Moreover, one or more embodiments, the series of acts 1100 includes determining a largest dimension of digital object. Furthermore, in one or more embodiments, the series of acts 1100 includes scaling a size of the digital object based on a scale factor between the largest dimension of the digital object and a stroke size of the path segment. Moreover, in one or more embodiments, the series of acts 1100 includes segmenting, utilizing a bilateral segmentation machine-learning model, a digital object into a first half segment and a second half segment. In one or more embodiments, the series of acts 1100 includes determining, utilizing a symmetry axis detection model, an axis of symmetry of the digital object based on the first half segment and the second half segment. Further still, in one or more embodiments, the series of acts 1100 includes generating a custom arrow object by attaching the digital object to an endpoint of a path segment at the axis of symmetry.

Moreover, in one or more embodiments, the series of acts 1100 includes rotating the digital object to align the axis of symmetry with a tangent of the endpoint of the path segment. In one or more embodiments, the series of acts 1100 further includes determining symmetry pixels associated with an intersection of the first half segment and the second half segment. In addition, in one or more embodiments, the series of acts 1100 includes fixing a line to the symmetry pixels. Furthermore, in one or more embodiments, the series of acts 1100 includes comprises utilizing a transformer-based neural network to classify pixels in an image comprising the digital object as background pixels, first half pixels, or second half pixels.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 12:
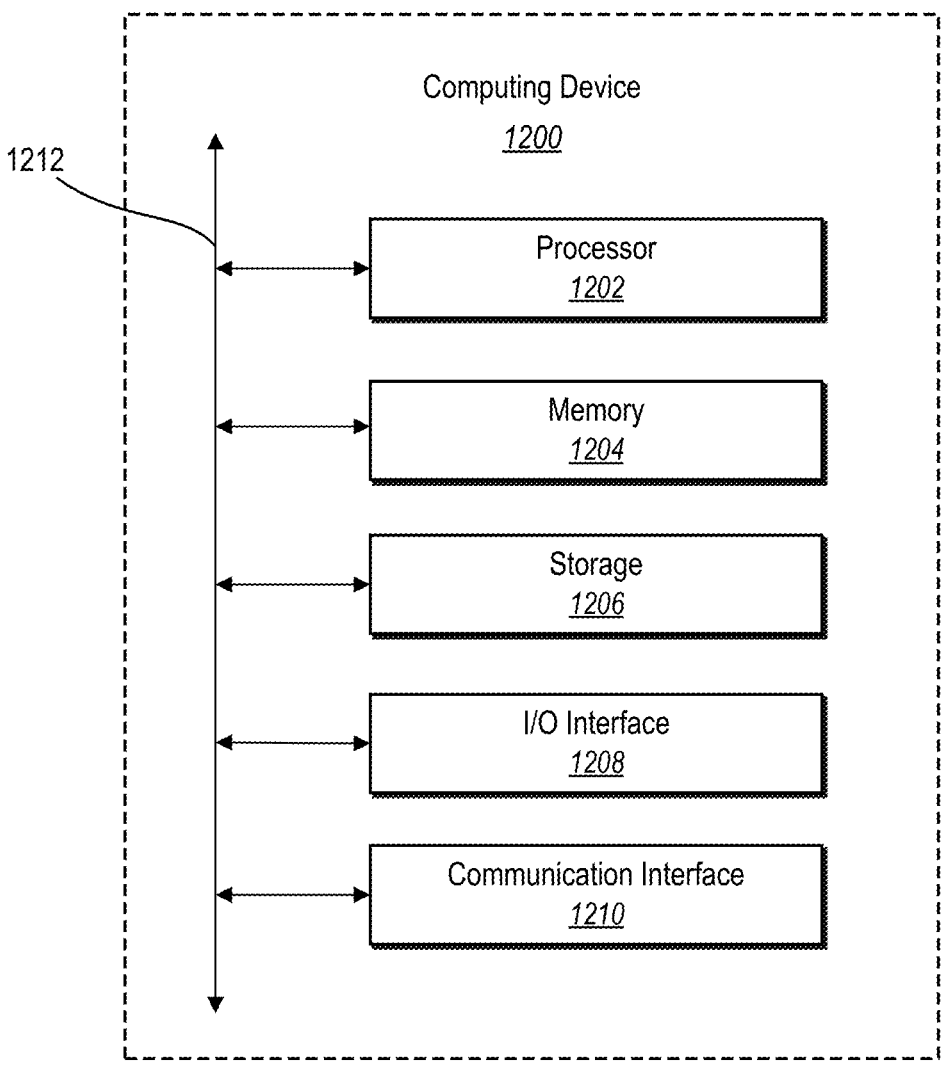
FIG. 12 illustrates a block diagram of an example computing device in accordance with one or more embodiments.

FIG. 12 illustrates a block diagram of an example computing device 1200 that may be configured to perform one or more of the processes described above. One will appreciate that one or more computing devices, such as the computing device 1200 may represent the computing devices described above (e.g., server device(s) 102, client device(s) 110, and computing device 1200). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:
receiving a client device interaction indicating a request to create a custom arrow object;
detecting, based on the client device interaction, that a digital object is within a threshold distance of an endpoint of a path segment; and
generating a custom arrow object based on the digital object being within the threshold distance by:
segmenting, utilizing a bilateral segmentation machine-learning model, the digital object into a first half segment and a second half segment;
determining, utilizing a symmetry axis detection model, an axis of symmetry of the digital object based on the first half segment and the second half segment; and
attaching the digital object to an endpoint of the path segment at the axis of symmetry.

2. The method of claim 1, further comprising:
determining a tangent of the endpoint of the path segment; and
rotating the digital object to align the axis of symmetry with the tangent of the endpoint of the path segment.

3. The method of claim 1, wherein determining the axis of symmetry comprises:
determining symmetry pixels associated with an intersection of the first half segment and the second half segment; and
determining a line corresponding to the symmetry pixels utilizing linear regression.

4. The method of claim 3, wherein determining the axis of symmetry further comprises:

determining, utilizing an edge detection model, edges around the digital object;

determining, utilizing the edge detection model, segmentation edges around the first half segment and the second half segment; and determining the symmetry pixels by subtracting the edges around the digital object from the segmentation edges around the first half segment and the second half segment.

5. The method of claim 4, further comprising:

applying a gaussian blur to one or more of the segmentation edges around the first half segment and the second half segment or the edges around the digital object; and thinning one or more of the segmentation edges around the first half segment and the second half segment or the edges around the digital object.

6. The method of claim 1, further comprising:

determining, utilizing an orientation model, a first structural similarity index score between the digital object and a tapered object oriented in a first direction;

determining, utilizing the orientation model, a second structural similarity index score between the digital object and the tapered object oriented in a second direction; and determining an end of the digital object to attach to the path segment based on comparing the first structural similarity index score and the second structural similarity index score.

7. The method of claim 1, wherein segmenting, utilizing the bilateral segmentation machine-learning model, the digital object into the first half segment and the second half segment comprises utilizing a transformer-based neural network to classify pixels in an image comprising the digital object as background pixels, first half pixels, or second half pixels.

8. The method of claim 1, further comprising:

determining a scale factor by comparing a width of the digital object, a height of the digital object, and a width of the path segment; and scaling the digital object based on the scale factor.

9. The method of claim 1, further comprising:

receiving a text prompt indicating an object to generate; and generating the digital object from the text prompt utilizing a text-to-image diffusion neural network.

10. The method of claim 1, wherein generating the custom arrow object is performed without user input other than the client device interaction.

11. A system comprising:

a memory component; and one or more processing devices coupled to the memory component, the one or more processing devices to perform operations comprising:

segmenting, utilizing a transformer-based neural network, a digital object into a first half segment and a second half segment by classify pixels in an image comprising the digital object as background pixels, first half pixels, or second half pixels;

determining an axis of symmetry of the digital object based on the first half segment and the second half segment; and generating a custom arrow by attaching the digital object to an endpoint of a path segment at the axis of symmetry.

12. The system of claim 11, wherein the operations further comprise:

determining, based on a structural orientation of the digital object, the digital object is inverted relative to the path segment; and rotating the digital object to be aligned with a direction of the path segment.

13. The system of claim 11, wherein determining the axis of symmetry further comprises:

determining symmetry pixels associated with an intersection of the first half segment and the second half segment; and fixing a line to the symmetry pixels.

14. The system of claim 11, wherein the operations further comprise:

rotating the digital object so the axis of symmetry is parallel to an axis of symmetry of a tapered object;

determining, utilizing a structural orientation model, a first structural similarity index score between the digital object and the tapered object oriented in a top-up orientation;

determining, utilizing the structural orientation model, a second structural similarity index score between the digital object and the tapered object oriented in a top-down orientation; and comparing the first structural similarity index score and the second structural similarity index score to determine a top end and a bottom end of the digital object, wherein attaching the digital object to the endpoint of the path segment at the axis of symmetry comprises attaching the bottom end of the digital object to the endpoint of the path segment.

15. The system of claim 11, wherein the operations further comprise generating parameters for the transformer-based neural network based on a synthetic dataset of symmetrical shapes rotated to different angles.

16. The system of claim 11, wherein the operations further comprise:

determining a largest dimension of digital object; and scaling a size of the digital object based on a scale factor between the largest dimension of the digital object and a stroke size of the path segment.

17. A non-transitory computer readable medium storing executable instructions which, when executed by a processing device, cause the processing device to perform operations comprising:

segmenting, utilizing a bilateral segmentation machine-learning model, a digital object into a first half segment and a second half segment;

determining, utilizing a symmetry axis detection model, an axis of symmetry of the digital object based on the first half segment and the second half segment; and generating a custom arrow object by attaching the digital object to an endpoint of a path segment at the axis of symmetry.

18. The non-transitory computer readable medium of claim 17, wherein the operations further comprise rotating the digital object to align the axis of symmetry with a tangent of the endpoint of the path segment.

19. The non-transitory computer readable medium of claim 18, wherein determining, utilizing the symmetry axis detection model, the axis of symmetry of the digital object comprises:

determining symmetry pixels associated with an intersection of the first half segment and the second half segment; and fixing a line to the symmetry pixels.

20. The non-transitory computer readable medium of claim 17, wherein segmenting, utilizing the bilateral segmentation machine-learning model, the digital object into the first half segment and the second half segment comprises utilizing a transformer-based neural network to classify 5 pixels in an image comprising the digital object as background pixels, first half pixels, or second half pixels.

\* \* \* \* \*